(12) United States Patent
Weaver et al.

(10) Patent No.: US 11,457,654 B2
(45) Date of Patent: Oct. 4, 2022

(54) METHODS FOR CONTINUOUSLY BLANCHING A MICROCROP AND HIGH-CONCENTRATION PROTEIN PRODUCTS DERIVED THEREFROM

(71) Applicant: Parabel Ltd., Grand Cayman (KY)

(72) Inventors: Harvey Weaver, Fellsmere, FL (US); Girish Kasat, Melbourne, FL (US); Brian Lovas, Palm Bay, FL (US)

(73) Assignee: Lemnature AquaFarms Corporation, Vero Beach, FL (US)

( * ) Notice: Subject to any disclaimer, the term of this patent is extended or adjusted under 35 U.S.C. 154(b) by 607 days.

(21) Appl. No.: 16/250,063

(22) Filed: Jan. 17, 2019

(65) Prior Publication Data

US 2019/0150489 A1    May 23, 2019

Related U.S. Application Data

(62) Division of application No. 15/263,310, filed on Sep. 12, 2016, now Pat. No. 10,194,684.

(Continued)

(51) Int. Cl.
*A23L 17/60* (2016.01)
*A23J 1/00* (2006.01)
(Continued)

(52) U.S. Cl.
CPC ............... *A23L 17/60* (2016.08); *A23J 1/00* (2013.01); *A23J 1/006* (2013.01); *A23J 3/14* (2013.01); *A23K 10/30* (2016.05); *A23V 2002/00* (2013.01)

(58) Field of Classification Search
CPC .. A23L 17/60; A23K 10/30; A23J 1/00; A23J 1/006; A23J 3/14; A23V 2002/00
(Continued)

(56) References Cited

U.S. PATENT DOCUMENTS

| 2,522,513 A | 9/1950 | Hemmeter |
| 296,200 A | 10/1954 | Olson |

(Continued)

FOREIGN PATENT DOCUMENTS

| CN | 10111696 | 2/2008 |
| CN | 101116986 | 2/2008 |

(Continued)

OTHER PUBLICATIONS

CN-101116986—Machine Translation. (Year: 2008).*

(Continued)

*Primary Examiner* — Hamid R Badr
(74) *Attorney, Agent, or Firm* — Baker & McKenzie LLP

(57) ABSTRACT

The present disclosure provides, according to some embodiments, methods for continuously blanching a microcrop and high-concentration protein products derived therefrom. In some embodiments, the present disclosure provides a method of continuously blanching a biomass, the method comprising: contacting a first portion of the biomass with a blanching solution to generate a first blanched biomass; dewatering the first blanched biomass to generate a separated solution; collecting the separated solution; contacting a second portion of the biomass with the separated solution to generate a second blanched biomass; dewatering the second portion of the biomass to generate the separated solution; and drying at least one of the first blanched biomass and the second blanched biomass to generate at least one of a protein concentrate flake and a protein concentrate granule, with the protein concentrate flake or granule having at least 45% DMB protein and with the protein having a PDCAAS value of at least 0.88.

17 Claims, 5 Drawing Sheets

Related U.S. Application Data

(60) Provisional application No. 62/216,975, filed on Sep. 10, 2015.

(51) Int. Cl.
*A23K 10/30* (2016.01)
*A23J 3/14* (2006.01)

(58) Field of Classification Search
USPC .......................................................... 426/656
See application file for complete search history.

(56) References Cited

U.S. PATENT DOCUMENTS

| | | | |
|---|---|---|---|
| 2,692,200 | A | 10/1954 | Olson |
| 2,827,454 | A | 3/1958 | Nord |
| 2,867,945 | A | 1/1959 | Gotaas et al. |
| 3,468,057 | A | 9/1969 | Buisson et al. |
| 3,499,687 | A | 3/1970 | Ellis |
| 3,674,501 | A | 7/1972 | Betz et al. |
| 3,704,041 | A | 11/1972 | Loveland et al. |
| 3,768,200 | A | 10/1973 | Klock |
| 3,839,198 | A | 10/1974 | Shelef |
| 3,930,450 | A | 1/1976 | Symons |
| 3,955,318 | A | 5/1976 | Hulls |
| 4,005,546 | A | 2/1977 | Oswald |
| 4,041,640 | A | 8/1977 | Itanami et al. |
| 4,042,367 | A | 8/1977 | Wilson |
| 4,066,633 | A | 1/1978 | Gastineau et al. |
| 4,077,158 | A | 3/1978 | England |
| 4,137,868 | A | 2/1979 | Pryor |
| 4,253,271 | A | 3/1981 | Raymond |
| 4,429,867 | A | 2/1984 | Barber |
| 4,516,528 | A | 3/1985 | Jones |
| 4,525,370 | A * | 6/1985 | Parkes ............... A23B 7/06 426/508 |
| 4,557,937 | A | 12/1985 | Bournier |
| 4,560,032 | A | 12/1985 | Imanaka |
| 4,604,948 | A | 8/1986 | Goldhahn |
| 4,840,253 | A | 6/1989 | DiMaggio et al. |
| 4,910,912 | A | 3/1990 | Lowrey, III |
| 5,047,332 | A | 9/1991 | Chahal |
| 5,121,708 | A | 6/1992 | Nuttle |
| 5,171,592 | A | 12/1992 | Holtzapple et al. |
| 5,269,819 | A | 12/1993 | Porath |
| 5,527,456 | A | 6/1996 | Jensen |
| 5,659,977 | A | 8/1997 | Jensen et al. |
| 5,667,445 | A | 9/1997 | Lochtefeld |
| 5,704,733 | A | 1/1998 | de Greef |
| 5,941,165 | A | 8/1999 | Butte |
| 6,077,548 | A | 6/2000 | Lasseur et al. |
| 6,096,546 | A | 8/2000 | Raskin |
| 6,251,643 | B1 | 6/2001 | Hansen et al. |
| 6,348,347 | B1 | 2/2002 | Hirabayashi et al. |
| 7,058,197 | B1 | 6/2006 | McGuire et al. |
| 7,215,420 | B2 | 5/2007 | Gellerman et al. |
| 7,674,077 | B2 | 3/2010 | Opatril |
| 8,245,440 | B2 | 8/2012 | Ryan et al. |
| 8,287,740 | B2 | 10/2012 | Newman et al. |
| 8,722,878 | B2 | 5/2014 | Raines et al. |
| 9,675,054 | B2 | 6/2017 | Grajcar et al. |
| 2004/0030516 | A1 | 2/2004 | Dunhill et al. |
| 2004/0144025 | A1 | 7/2004 | Johnson Rutzke |
| 2006/0024689 | A1 | 2/2006 | Bleuart et al. |
| 2007/0048859 | A1 | 3/2007 | Sears |
| 2007/0151522 | A1 | 7/2007 | Brauman |
| 2008/0032349 | A1 | 2/2008 | Viscovk et al. |
| 2008/0096267 | A1 | 4/2008 | Howard et al. |
| 2008/0155890 | A1 | 7/2008 | Oyler |
| 2009/0088757 | A1 | 4/2009 | Tulkis |
| 2009/0151240 | A1 | 6/2009 | Kayama et al. |
| 2009/0285642 | A1 | 11/2009 | De Greef |
| 2010/0028505 | A1 | 2/2010 | Katzke et al. |
| 2010/0041095 | A1 | 2/2010 | Zeikus |
| 2010/0116986 | A1 | 5/2010 | Obuki et al. |
| 2010/0151558 | A1 | 6/2010 | Alianell et al. |
| 2010/0162620 | A1 | 7/2010 | McCaffrey et al. |
| 2010/0281836 | A1 | 11/2010 | Vanhoute et al. |
| 2010/0325948 | A1 | 12/2010 | Parsheh et al. |
| 2011/0016773 | A1 | 1/2011 | Nichols et al. |
| 2011/0092726 | A1 | 4/2011 | Clarke |
| 2011/0172102 | A1 | 7/2011 | Jacob et al. |
| 2012/0009660 | A1 | 1/2012 | Pottathil et al. |
| 2012/0110901 | A1 | 5/2012 | Olivier et al. |
| 2012/0117869 | A1 | 5/2012 | Javan et al. |
| 2012/0171753 | A1 | 7/2012 | Ivry |
| 2012/0288917 | A1 | 11/2012 | Krenbrink et al. |
| 2012/0308989 | A1 | 12/2012 | Barclay et al. |
| 2013/0023044 | A1 | 1/2013 | Gleason |
| 2013/0183705 | A1 | 7/2013 | Barclay et al. |
| 2013/0192130 | A1 | 8/2013 | Eckelberry |
| 2013/0244309 | A1 | 9/2013 | Singh et al. |
| 2014/0023675 | A1 | 1/2014 | Lina et al. |
| 2014/0212955 | A1 | 7/2014 | Ploechinger |
| 2014/0221630 | A1 | 8/2014 | Olivier et al. |
| 2014/0338261 | A1 | 11/2014 | Sykes |
| 2014/0356496 | A1 | 12/2014 | Melnyczuk |
| 2015/0072400 | A1 | 3/2015 | Clarke |
| 2015/0275161 | A1 | 10/2015 | Gressel et al. |
| 2016/0030350 | A1 | 2/2016 | Muller |
| 2016/0288001 | A1 | 10/2016 | Johnson |
| 2016/0360715 | A1 | 12/2016 | Sherlock et al. |
| 2017/0223935 | A1 | 8/2017 | Behrens |
| 2018/0014486 | A1 | 1/2018 | Creechley et al. |
| 2018/0118595 | A1 | 5/2018 | Curry |

FOREIGN PATENT DOCUMENTS

| | | |
|---|---|---|
| CN | 101370574 A | 2/2009 |
| CN | 101595943 | 12/2009 |
| CN | 102448286 | 5/2012 |
| CN | 103002752 A | 3/2013 |
| CN | 202960947 | 6/2013 |
| CN | 202960947 U | 6/2013 |
| CN | 104126494 | 11/2014 |
| CN | 104126494 A | 11/2014 |
| CN | 204092345 | 1/2015 |
| CN | 104413257 | 3/2015 |
| CN | 104585067 A | 5/2015 |
| DE | 4133920 | 11/1993 |
| EP | 0285195 | 10/1988 |
| EP | 0765599 | 4/1997 |
| FR | 2522479 | 9/1983 |
| JP | S52151199 | 12/1977 |
| JP | 54-73148 | 6/1979 |
| JP | S54147650 | 11/1979 |
| JP | S56-031425 | 3/1981 |
| JP | S59-183635 A | 10/1984 |
| JP | 2001502918 | 3/2001 |
| JP | 2001-346544 | 12/2001 |
| JP | 2002-306147 A | 10/2002 |
| JP | 2002-532112 A | 10/2002 |
| JP | 2004097021 | 4/2004 |
| JP | 2005007837 | 1/2005 |
| JP | 2005065626 A | 3/2005 |
| JP | 2008-043207 A | 2/2008 |
| JP | 2010-214278 A | 9/2010 |
| JP | 2011-019508 A | 2/2011 |
| JP | 2011254724 A | 12/2011 |
| JP | 2013521808 A | 6/2013 |
| KR | 20000018164 U | 10/2000 |
| KR | 101153379 | 6/2012 |
| MX | 2011010995 | 1/2012 |
| NL | 20111038645 | 9/2012 |
| WO | 9105849 | 5/1991 |
| WO | 9818344 | 5/1998 |
| WO | 0145523 | 6/2001 |
| WO | 2002034755 | 5/2002 |
| WO | 03028432 | 4/2003 |
| WO | 2007109066 | 9/2007 |
| WO | 2007111677 | 10/2007 |
| WO | 2008020457 | 2/2008 |
| WO | 2008033573 | 3/2008 |
| WO | 2010123943 | 10/2010 |

(56) References Cited

FOREIGN PATENT DOCUMENTS

| WO | 2010144877 | 12/2010 |
|---|---|---|
| WO | 2011044194 | 4/2011 |
| WO | 2011116252 | 9/2011 |
| WO | WO2011116252 | 9/2011 |
| WO | 2011-156662 A2 | 12/2011 |
| WO | 2011156662 | 12/2011 |
| WO | 2014046543 | 3/2014 |

OTHER PUBLICATIONS

Iqbal, S. SANDEC Reports No. (6/99) (Year: 1999).*
Goopy, J. P. et al. Asian-Aust. J. Anim. Sci.16:297-305 (Year: 2003).*
Freidig et al., Variation in Oxalic Acid Content among Commercial Table Beet Cultivars and Related Crops. Journal of the American Society for Horticultural Science, vol. 136, No. 1, pp. 54-60 (2011).
Extended Search Report in European Patent Application No. 16835862.0, dated Nov. 9, 2018.
Mazen, Ahmed M.A., "Calcium oxalate formation in Lemna minor: physiological and ultrastructural aspects of high capacity calcium sequestration" New Phytologist vol. 161, pp. 435-448, 2003.
Extended Search Report in European Patent Application No. 16845285.2 dated Jan. 15, 2019.
Watson, Elaine, "Ultra-fast-growing aquatic plant promises year-round supply of sustainable vegetable protein", Jul. 24, 2015, p. 1-4, XP055537613, www.bakeryandsnacks.com, Retrieved from Internet: URL: www.bakeryandsnacks.com/Article/2015/07/06/Aquatic-plant-promises-year-round-supply-of-sustainable-plant-protein. [Retrieved from Internet on Dec. 21, 2018].
Extended Search Report in European Patent Application No. 16808454.9 dated Feb. 6, 2019.
Kwag, J.H. et al. "Conditions for artificial culture of Lemna Paucicostata and potentiality as an alternative biomass source"; J.Lives.House & Env. 16 (2) pp. 143-152, 2010.
First Examination Report in Australian Patent Application No. 2016276974, dated Apr. 9, 2019.
Partial Supplementary European Search Report in European Patent Application No. 16808454.9 dated Nov. 11, 2018.
International Preliminary Report on Patentability by the International Preliminary Examination Authority (Korean Intellectual Property Office) in International Application No. PCT/US2016/051380, dated Mar. 13, 2018.
International Preliminary Report on Patentability by the International Preliminary Examination Authority (Koean Intellectual Property Office) in PCT/US2016/051366, dated Mar. 22, 2018.
International Search Report and Written Opinion of the International Searching Authority (Korean Intellectual Property Office) in International Application No. PCT/US2016/051366, dated Dec. 22, 2016.
International Search Report and Written Opinion of the International Searching Authority (Korean Intellectual Property Office) in International Application No. PCT/US2016/051380, dated Dec. 26, 2016.
Mutiara, Titi K., et al, 'Effect of blanching treatments against protein content and amino acid drumstick leaves (*Moringa oleifera*)', Journal of Food Research, vol. 2, No. 1, pp. 101-108 (2013).
Schaafsma, Gertjan, 'Advantages and limitations of the protein digestibility-corrected amino acid score (PDCAAS) as a method for evaluating protein quality in human diets', British Journal of Nutritiion, vol. 108, pp. S333-S336 (2012).
Lentein, "Clean. Green. Protein", Retrieved from: https://web.archive.org/web/20150901074209/https://lentein.com, web accessed on Jul. 17, 2020.
Lentein, "Green Protein Powder", Retrieved from: https://web.archive.org/web/20150822012645/https://lentein.com/lentein-plus-powder, web accessed on Jul. 17, 2020.
Office Action, mailed in Japanese Patent Application No. 2018-516396, dated Jun. 2, 2020.
Office Action, mailed in Japanese Patent Application No. 2018-516401, dated Jun. 2, 2020.
Office Action, mailed in Japanese Patent Application No. 2018-532528, dated Jun. 23, 2020.
Examination Report dated Dec. 7, 2020 in European Patent Application No. 16845285.2.
Stuart L. Cantor: "New Plant Protein Powerhouses Prepared Foods", Sep. 11, 2015, XP055755579.
Titi Mutiara Kirana et al. "Effect of Blanching Treatments Against Protein Content and Amino Acid Drumstrick Leaves (*Moringa oleifera*)", Journal of Food Research, vol. 2, No. 1, Jan. 1, 2013, pp. 101-108, XP055367771.
Examination Report dated Dec. 17, 2020 in Australian Patent Application No. 2016321414.
Office Action dated Jan. 6, 2020 in Chinese Patent Application No. CN201680047105.X.
Office Action dated Feb. 19, 2020 in Australian Patent Application No. AU2016275066.
Office Action dated Aug. 21, 2020 in Chinese Application No. 201680065224.8.
Office Action dated Nov. 12, 2020 in European Patent Application No. 16808482.0.
Examination Report, mailed in related Chinese Patent Application No. 201080023569.X, dated Sep. 20, 2012.
Office Action, mailed in Brazilian Patent Application No. PI1015000-5, notification published Jan. 23, 2018.
Office Action mailed in Brazilian Patent Application No. PI1015000-5, dated Dec. 20, 2017.
International Search Report and Written Opinion of the International Searching Authority (US) in related International Application No. PCT/US2010/031811, dated Jun. 18, 2010.
International Preliminary Report on Patentability of the International Preliminary Examination Authority (US) in related International Application No. PCT/US2010/031811, dated Oct. 11, 2011.
Office Action received in Brazilian Patent Application No. PI1015000-5, notification published May 10, 2018.
Office Action, mailed in Chinese Patent Application No. 201610789415.0 dated Nov. 5, 2018.
International Search Report and Written Opinion of the International Searching Authority (US) in PCT International Application No. PCT/US2011/028911, dated Nov. 30, 2011.
Office Action in Mexican Patent Application No. MX/a/2014/010053, dated Feb. 13, 2017.
Office Action mailed in Malaysian Patent Application No. PI 2011005000 dated Jun. 30, 2015.
Extended Search Report in European Patent Application No. 11757038.2, dated Mar. 9, 2017.
Office Action in European Patent Application No. 11757038.2, dated Jul. 16, 2018.
Office Action in Australian Patent Application No. 2015255285, dated Mar. 3, 2017.
Preliminary Examination Report in Peruvian Patent Application No. 1563-2012, dated Apr. 17, 2017.
International Preliminary Report on Patentability of the International Preliminary Examination Authority in PCT International Application No. PCT/US2011/028911, dated Sep. 18, 2012.
Office Action in Canadian Patent Application No. 2793512, dated Mar. 28, 2018.
Office Action in Canadian Patent Application No. 2793512, dated Aug. 7, 2017.
Office Action in Indonesian Patent Application No. W00201204170, dated Sep. 29, 2017.
Office Action in Japanese Patent Application No. 2015-020932 dated Jan. 27, 2017.
Office Action in Japanese Patent Application No. 2015-020932 dated Dec. 5, 2017.
Office Action in Indian Patent Application No. 8902/DELNP/2012 dated Aug. 3, 2018.
Office Action in European Patent Application No. 11757038.2, dated Jan. 3, 2019.
International Preliminary Report on Patentability by the International Preliminary Examination Authority for International Application No. PCT/US2016/037097, dated Dec. 22, 2017.

(56) References Cited

OTHER PUBLICATIONS

International Search Report and Written Opinion of the International Searching Authority for PCT application No. PCT/US2016/037099, dated Oct. 5, 2016.
International Preliminary Report on Patentability by the International Preliminary Examination Authority (Korean Intellectual Patent Office) for International Application No. PCT/US2016/037099, dated Dec. 12, 2017.
Extended Search Report in European Patent Application No. 16808483.8, dated Dec. 21, 2018.
International Preliminary Report on Patentability by the International Preliminary Examination Authority (Korean Intellectual Property Office) for International Application No. PCT/US2016/037046, dated Dec. 12, 2017.
International Preliminary Report on Patentability by the International Preliminary Examination Authority (Korean Intellectual Property Office) for International Application No. PCT/US2016/041156, dated Jan. 18, 2018.
International Search Report and Written Opinion of the International Searching Authority (Korean Intellectual Property Office) for corresponding PCT application No. PCT/US2016/046422, dated Nov. 10, 2016.
International Preliminary Report on Patentability by the International Preliminary Examination Authority (Korean Intellectual Property Office) for International Application No. PCT/US2016/046422, dated Feb. 22, 2018.
International Search Report and Written Opinion of the International Searching Authority (Korean Intellectual Property Office) for International Application No. PCT/US2016/037097, dated Sep. 12, 2016.
Supplementary European Search Report in European Patent Application No. 16808482.0, dated Feb. 21, 2019.
Sogbesan, OA; "Utilization of Treated Duckweed Meal (*Lemna pausicostata*) as Plant Protein Supplement in African Mud Catfish (*Clarias gariepinus*) Juvenile Diets" Fisheries and Aquaculture Journal, vol. 6, Issue 4, ISSN: 2150-3508 FAJ, 2015.
Extended Search Report of European Patent Office in European Patent Application No. 16845295.1, dated Jan. 15, 2019.
Office Action, mailed in Indian Patent Application No. 8948/DELNP/2011 dated Apr. 11, 2018.
Office Action, mailed in Brazilian Patent Application No. PI1015000-5, dated Sep. 26, 2018.
Pedroni et al., A Proposal to Establish International Network on Biofixation of C02 and Greenhouse Gas Abatement with Microalgae, Journal of Energy and Environmental Research, vol. 1, No. 1, Nov. 2001.
Hallam, Murray, Practical Aquaponics for Everyone. Retrieved from Internet: URL: www.aquaponics.net.au/sites1 O.html, Wayback Machine publication dated Dec. 2008, 3 pages.
The Garden Pond Blog. Retrieved from Internet: URL: jeremybiggs.wordpress.com/2008/10/28/duck-attack/ , publication Oct. 2008, 2 pages.
Workshop to produce an Information Kit on Farmer-proven integrated agriculture-aquaculture technologies, IIRR; Retrieved from Internet: collections.infocollections.org/ukedu/en/d/Jii23we/9.1.html, 1992, 10 pages.
Fasakin, E.A. "Nutrient quality of leaf protein concentrates produced from water fern {*Azolla africanna* Desv) and Duckweed {*Spirodela polyrrhiza* L. Schleiden)", Bioresource Technology., vol. 69, No. 2, Aug. 1, 1999 {Aug. 1, 1999), pp. 185-187.
Fowden, L. "The Composition of the Bulk Proteins of Chlorella" [online] Published Jun. 20, 1951. Retrieved fromInternet Jun. 1, 2017: <URL:https://www.ncbi.nlm.nih.gov/pmc/articles/PMC1197660/pdf/biochemj00910-0079.pdf>.
Bolenz, S. et al. "Treatments of Water Hyacinth Tissue to Obtain Useful Products", Biological Wastes, Amsterdam, NL, vol. 33, No. 4, Jan. 1, 1990 {Jan. 1, 1990), pp. 263-274.
Kindel, Paul K. et al. "Solubilization of pectic polysaccharides from the cell walls of Lemna minor and Apium graveolens". Phytochemistry, vol. 41, No. 3, Feb. 1, 1996 {Feb. 1, 1996), GB, pp. 719-723.
Byers, M. "The Amino Acid Composition of Some Leaf Protein Preparations" in IBP Handbook No. 20, Leaf Protein: Its agronomy, Preparation, Quality and Use. 1971, International Biological Programme pp. 95-115.
Kennedy, David "Leaf Concentrate: A Field Guide for Small Scale Programs". Leaf for Life, 1993.
International Search Report and Written Opinion of the International Searching Authority for PCT application No. PCT/US2016/037046, dated Oct. 27, 2016.
International Search Report and Written Opinion of the International Searching Authority (Korean Intellectual PatentOffice) for International Application No. PCT/US2016/041156, dated Oct. 18, 2016.
Cheng et al., "Growing Duckweed to Recover Nutrients from Wastewaters and for Production of Fuel Ethanol and Animal Feed", Clean, vol. 37, No. 1, pp. 17-26 (2009).
Office Action dated Dec. 14, 2020 in Chinese Application No. 201680058494.6.
Office Action dated Sep. 2, 2020 in Chinese Application No. 201680047105.x.
Office Action dated Dec. 3, 2020 in Chinese Application No. 201680047175.5.
Kammerer, Dietmar Rolf, Chapter 11—Resin Adsorption and Ion Exchange to Recover and Fractionate Polyphenols, Polyphenols in Plants, 219-230.
Office Action dated Nov. 17, 2020 in Brazilian Patent Application No. BR112018004808-9 (agent's reporting letter).
Mazen, Ahmed M. A., et al. Calcium oxalate formation in Lemna minor: physiological and ultrastructural aspects of high capacity calcium sequestration. New Phytologist (2003), 435-448.
Extended European Search Report dated Feb. 26, 2021 in European Patent Application No. 20197495.3.
Office Action dated Jul. 3, 2020 in Chinese Application No. 201680047237.2.
Office Action dated Jul. 9, 2020 in Japanese Application No. 2018-516402.
Office Action dated Aug. 4, 2020 in Japanese Application No. 2018-506982.
Office Action dated Jun. 24, 2020 in European Application No. 16845295.1.
Office Action dated Jun. 23, 2020 in Japanese Application No. 2018-532531.
Annual Review of Plant Biology, 2005, vol. 56, p. 41-71.
Sogbesan et al, "Utilization of Treated Duckweed Meal (*Lemna pausicostata*) as Plant Protein Supplement in African Mud Catfish (*Clarias gariepinus*) Juvenile Diets", Fisheries and Aquaculture Journal, vol. 06, No. 04, Jul. 12, 2015, p. 1-5, XP055535965.
Office Action dated May 28, 2021 in Australian Patent Application No. 2016276972.
Notice of Acceptance dated May 12, 2021 in Australian Patent Application No. 2016321425.
Office Action dated May 24, 2021 in Australian Patent Application No. 2020201808.
Office Action dated Jun. 18, 2021 in Chinese Patent Application No. 201680065224.8.
Office Action dated Apr. 27, 2021 in Japanese Patent Application No. 2018-532528.
European Search Report in European Patent Application 20211071.4 dated Oct. 1, 2021.
Gonzalez-Perez S et al: "Vegetable Protein Isolates" In: "Handbook of hydrocolloids", Jan. 1, 2009 (Jan. 1, 2009), XP055843364, pp. 1-27.
Zeki Berk: "Chapter 6—Isolated soybean Protein (ISP)", Technology of production of edible flours and protein products from soybeans, FAO Agricultural Services Bulletin No. 97, Jan. 1, 1992 (Jan. 1, 1992), p. 7pp, XP055690151, ISBN: 978-92-5-103118-6 Retrieved from the Internet: URL:http://www.fao.org/3/t0532e/t0532e07.htm [retrieved on Apr. 29, 2020].

\* cited by examiner

METHODS FOR CONTINUOUSLY BLANCHING A MICROCROP AND HIGH-CONCENTRATION PROTEIN PRODUCTS DERIVED THEREFROM

CROSS-REFERENCE TO RELATED APPLICATIONS

This application claims priority to and is a division of U.S. application Ser. No. 15/263,310 filed on Sep. 12, 2016, which claims priority to U.S. Provisional Application No. 62/216,975 filed Sep. 10, 2015, the contents of all of which are hereby incorporated in their entirety by reference. Applicants also incorporate herein by reference the entire contents of U.S. application Ser. No. 15/263,253, which was filed concurrently with U.S. application Ser. No, 15/263,310.

FIELD OF THE DISCLOSURE

The present disclosure relates, in some embodiments, to apparatuses and methods for blanching a microcrop (e.g., aquatic species, *Lemna, Wolffia*) and a protein product (e.g., high-concentration protein product) derived therefrom. In some embodiments, the present disclosure relates to apparatuses and methods for continuously blanching a microcrop and producing a protein product (e.g., high-concentration protein product) derived therefrom.

BACKGROUND OF THE DISCLOSURE

An ever-increasing global population continues to fuel a plethora of sustainability concerns including sufficient and affordable access to protein sources for both feed animals and human consumption, particularly in developing nations. While marine protein sources are often utilized in feeds due to their desirable nutritional profile and enhanced palatability, high production costs lead to an increased demand for alternatives. However, many plant species are unsuitable alternatives due to qualities such as inferior amino acid profile, inferior protein quality and/or quantity, inferior digestibility, high fiber content, and/or high oxalic acid content. Moreover, some protein sources pose significant allergy concerns to certain consumers (e.g., soy, dairy). Microcrop species (e.g., *Lemna, Spirodella, Wolffia*) that are properly blanched and processed yield protein preparations with many desirable qualities. However, biological characteristics of these microcrop species (e.g., *Lemna*) pose production and quality challenges. For example, many microcrop species grow as free-floating thalli on a surface of a growth medium. Such buoyancy of a microcrop species presents unique challenges in achieving a uniform blanching Additionally, water conservation concerns—particularly in equatorial and arid regions—are a driving factor in identifying suitable apparatuses and methods for producing high concentration protein products from microcrop species. Moreover, energy efficiency is also an important consideration, as the production of high-concentration protein products from microcrop species has enormous potential for alleviating protein shortages in developing economic regions.

SUMMARY

Accordingly, a need has arisen for improved apparatuses and methods for blanching (e.g., continuously) a microcrop (e.g., aquatic species, *Lemna*) and a protein product (e.g., high-concentration protein product) derived therefrom.

The present disclosure relates, according to some embodiments, to an apparatus for blanching a microcrop (e.g., *Lemna, Wolffia*) where the apparatus may include: a conveyance mechanism operable to transport a biomass to a blanching tray; an applicator operable to dispense a blanching solution onto at least one surface of the biomass within the blanching tray; the blanching tray oriented to receive a volume of the blanching solution from the applicator; and a vibratory mechanism capable of vibrating the blanching tray to generate a net motion of the received volume of the blanching solution within blanching tray such that a wave of blanching solution is formed. In some embodiments, a vibratory mechanism may be operable to generate a motive force capable of directing a biomass from a first side of a blanching tray to a second side of the blanching tray. In some embodiments, an apparatus may be capable of processing a biomass at a product flow rate ratio of about 7:1 (e.g., w/w, blanching solution:biomass).

In some embodiments, an apparatus may further include at least one of: a central control system operable to communicate with one or more elements of the apparatus; a heating element capable of heating a blanching solution to a temperature of at least 60° C.; and a pump and valve system operable to propel the blanching solution within the apparatus. An apparatus, in some embodiments, may include a first gauge. A first gauge may be operable to measure at least one of: a volume of blanching solution received within a blanching tray; a mass of a biomass within the blanching tray; a volume of a blanching solution exiting a blanching tray, a mass of a biomass exiting a blanching tray, a temperature of a blanching solution within a blanching tray, a temperature of a blanching solution exiting the blanching tray, and a rate of a net motion. According to some embodiments, a first gauge may be capable of communicating with at least one of: a central control system, a heating element, a pump and valve system, a shower, and a vibratory mechanism and any combination thereof.

An apparatus for blanching a microcrop (e.g., *Lemna, Wolffia*), in some embodiments, may include a settling tank connected to the blanching tray such that a blanched biomass may flow from the blanching tray into the settling tank. A settling tank may comprise at least one sloping surface, according to some embodiments. In some embodiments, an apparatus for blanching a microcrop may include a rinsing mechanism connected to a settling tank such that a blanched biomass may flow from the settling tank into the rinsing mechanism.

According to some embodiments, an apparatus for blanching a microcrop (e.g., *Lemna, Wolffia*) may include a dewatering mechanism (e.g., screw press, vibratory screen, both) connected to the blanching tray such that the blanched biomass is capable of flowing from the blanching tray into the dewatering mechanism. In some embodiments, a dewatering mechanism may be connected to a settling tank such that a blanched biomass may be capable of flowing from the settling tank into the dewatering mechanism.

The present disclosure further relates to a method of processing a biomass to generate a protein product (e.g., high-concentration protein product), where the method may include: contacting a first portion of the biomass with a first volume of blanching solution to generate a first blanched biomass, dewatering the first portion of the blanched biomass (e.g., using a screw press) to generate a separated solution; and drying the first blanched biomass to generate at least one of a first protein concentrate flake and a first protein concentrate granule. In some embodiments, contacting a first portion of a biomass may include at least one of applying a first volume of blanching solution to at least one surface of the first portion of the biomass and submerging the first portion of the biomass in a wave of blanching solution. According to some embodiments, a first volume of blanching solution may have a temperature of at least 60° C. In some embodiments, contacting a first portion of a biomass may be performed at a product flow rate ratio selected from: about 8:1, or about 7.5:1, or about 7:1, or about 6.5:1, or about 6:1, or about 5.5:1, or about 5:1, or about 4.5:1, or about 4:1. According to some embodiments, at least one of the first protein concentrate flake and the first protein concentrate granule comprises at least 45% protein, the protein having a Protein Digestibility Corrected Amino Acid Score (PDCAAS) value of at least 0.88.

Contacting, in some embodiments, may be for a period of less than 2 minutes (e.g., about 45 sec). According to some embodiments, contacting may be for a period of less than 2 min where a first volume of blanching solution may have a temperature between about 75° C. and 95° C. In some embodiments, a first volume of blanching solution may have a temperature of at least 85° C. A first volume of blanching solution, in some embodiments, may comprises at least one calcium salt.

In some embodiments, a method may include washing a first portion of the biomass with at least one of a first wash solution, a second wash solution, and a third wash solution, where the first wash solution, the second wash solution, and the third wash solution may be independently selected from a water, a recycled fluid, and an ozonated solution. A method of processing a biomass to generate a protein product (e.g., high-concentration protein product), in some embodiments, may further comprising milling at least one of a first protein concentrate flake and a first protein concentrate granule to generate a first protein concentrate flour. In some embodiments, a method may further comprise settling a blanched biomass in a settling solution.

According to some embodiments, a method of processing a biomass comprising a microcrop may include solvent extracting a first portion of the blanched biomass. In some embodiments, a wet protein concentrate may be separated from a separated solution using a vibratory screen (e.g., before solvent extraction).

A method of processing a biomass comprising a microcrop may include recycling a separated solution by performing at least one of: diluting the separated solution, filtering the separated solution, and monitoring the separated solution. In some embodiments, a method may include contacting a second portion of the biomass with a second volume of blanching solution or a recycled blanching solution to generate a second blanched biomass; dewatering the second blanched biomass to generate the separated solution; and drying the second blanched biomass to generate at least one of a second protein concentrate flake and a second protein concentrate granule. At least one of a second protein concentrate flake and a second protein concentrate granule may comprises at least 45% protein, the protein having a PDCAAS value of at least 0.88.

The present disclosure relates, in some embodiments to a method of continuously blanching a biomass (e.g., *Lemna, Wolffia*) to generate a high-concentrations protein product, the method comprising: contacting a first portion of the biomass with a blanching solution to generate a first blanched biomass; dewatering the first blanched biomass (e.g., using a screw press) to generate a separated solution; collecting the separated solution; contacting a second portion of the biomass with the separated solution to generate a second blanched biomass; dewatering the second portion of the biomass to generate the separated solution; and drying at least one of the first blanched biomass and the second blanched biomass to generate at least one of a protein concentrate flake and a protein concentrate granule. Contacting a first portion of a biomass or a second portion of a biomass, according to some embodiments at least one of: applying a first volume of blanching solution, a second volume of blanching solution, or a recycled blanching solution to at least one surface of the biomass (e.g., first portion, second portion) and submerging the biomass in a wave of blanching solution. According to some embodiments, a blanching solution may have a temperature of at least 60° C. In some embodiments, contacting a biomass (e.g., first portion, second portion) may be performed at a product flow rate ratio selected from: about 8:1, or about 7.5:1, or about 7:1, or about 6.5:1, or about 6:1, or about 5.5:1, or about 5:1, or about 4.5:1, or about 4:1. Contacting, in some embodiments, may be for a period of less than 2 minutes (e.g., about 45 sec). According to some embodiments, contacting may be for a period of less than 2 min where a first volume of blanching solution may have a temperature between about 75° C. and 95° C. In some embodiments, a first volume of blanching solution may have a temperature of at least 85° C. A first volume of blanching solution, in some embodiments, may comprises at least one calcium salt.

According to some embodiments, at least one of the first protein concentrate flake and the first protein concentrate granule comprises at least 45% DMB protein, the protein having a Protein Digestibility Corrected Amino Acid Score (PDCAAS) value of at least 0.88.

In some embodiments, a method may include diluting a separated solution. A method, in some embodiments, may further comprise settling a first blanched biomass, or the second blanched biomass, or both in a settling solution. According to some embodiments, a method may include milling at least one of a protein concentrate flake and a protein concentrate granule to generate a protein concentrate flour.

A method, in some embodiments, may further comprise cultivating a microcrop in a first medium comprising at least one of an antiphotosynthetic dye and a calcium composition of at least 100 ppm; and harvesting the microcrop to generate the biomass. In some embodiments, a method may include soaking a biomass in a second medium, where the second medium comprises less than about 8 ppm of a calcium source, or less than about 4 ppm of a nitrogen source, or both.

In some embodiments, a method may include solvent extracting a first blanched biomass, or a second blanched biomass, or both. A vibratory screen may be used to dewater a first blanched biomass, a second blanched biomass, or both prior to solvent extracting. In some embodiments, a method may include dewatering a first blanched biomass, a second blanched biomass, or both after solvent extracting, where the dewatering is performed using a screw press.

The present disclosure further relates, in some embodiments, to a protein product (e.g., high-concentration protein product) generated by processing a biomass comprising a microcrop, by a method described herein to generate at least one of a first protein concentrate flake and a first protein concentrate granule. At least one of a first protein concentrate flake and a first protein concentrate granule may comprise at least 45% protein, the protein having a PDCAAS value of at least 0.88. In some embodiments, the PDCAAS value may be limited by histidine.

In some embodiments, at least one of a first protein concentrate flake and a first protein concentrate granule may include at least one of following characteristics: the protein may have a PDCAAS value of at least 0.92, a digestibility of at least 90%, an ash content of less than 10% DMB, a dietary fiber content of at least 30%, an oxalic acid content of less than 1% DMB, and a polyphenol content of less of less than 3.2 mg/100 g. According to some embodiments, at least one of a first protein concentrate flake and a first protein concentrate granule may comprise an oxalic acid content of less than 0.25% DMB, a polyphenol content of less than 1.75 mg/100 g, or both.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

Some embodiments of the disclosure may be understood by referring, in part, to the present disclosure and the accompanying drawings, wherein.

DETAILED DESCRIPTION

Figure 1:
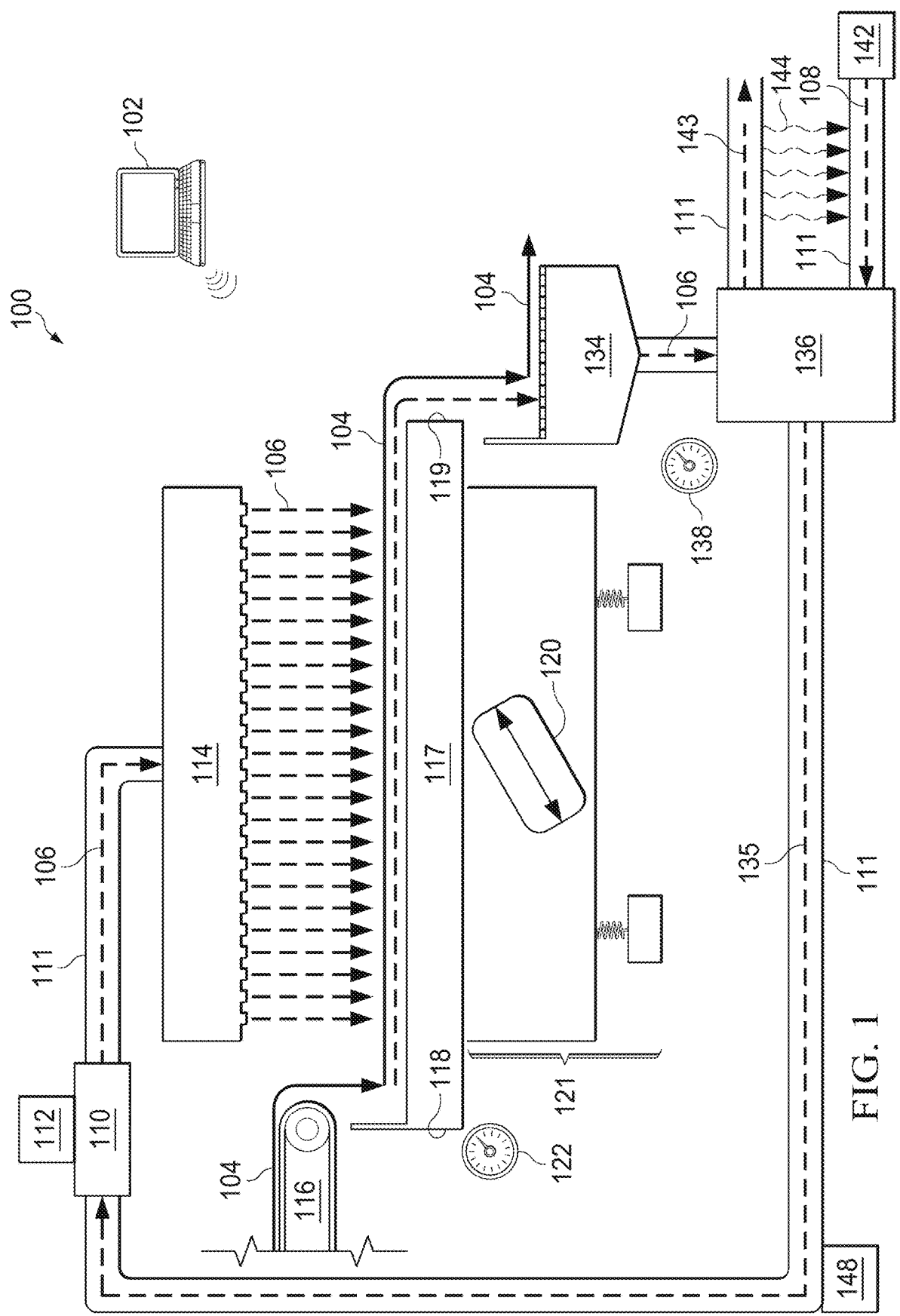
FIG. 1 illustrates an apparatus capable of blanching a biomass, according to a specific example embodiment of the disclosure.

The present disclosure relates, in some embodiments, to methods and apparatuses for blanching (e.g., continuously) a microcrop to generate a high concentration protein product. According to some embodiments, the present disclosure relates to high concentration protein products derived using a method or apparatus for blanching (e.g., continuously) a microcrop (e.g., *Lemna*).

Microcrop

In some embodiments, a microcrop may comprise a single aquatic species (e.g., *Lemna* species, *Salvinia* species). A microcrop may include species of *Lemna* (e.g., duckweed), *Spirodela, Landoltia, Wolfiella, Salvinia* (e.g., floating fern), *Wolffia*(e.g., watermeal), *Azolla* (e.g., mosquito fern), *Pistia* (e.g., water lettuce), or any combination thereof. According to some embodiments, a microcrop may be a species of *Lemna*, for example, *Lemna minor, Lemna obscura, Lemna minuta, Lemna gibba, Lemna valdiviana*, or *Lemna aequinoctialis*. A microcrop may comprise, according to some embodiments, a combination of two or more aquatic species. In some embodiments, a microcrop may be selected from a local aquatic species based on identified compositional and growth characteristics that have developed within the local environmental conditions. Local species may out-compete other species in open ponds or bioreactors based on their adaptation to the local environmental conditions. A microcrop, in some embodiments, may be adjusted in response to seasonal variations in temperature and light availability.

A microcrop may have characteristics that are advantageous in comparison to other aquatic species (e.g., rapid growth rate; reduced nutritional requirements; ease of harvesting and/or processing; enhanced amino acid profile; enhanced palatability; reduced evapotranspiration rate; increased protein composition).

For example, *Lemna* is a genus of free-floating aquatic plants from the Lemnaceae family (e.g., duckweed) that grow rapidly. *Lemna* protein has an essential amino acid profile that more closely resembles animal protein than most other plant proteins. Table 1 shows a typical essential amino acid compositional profile of *Lemna* protein. Additionally, *Lemna* provides high protein yields, with freshly harvested *Lemna* containing up to about 43% protein by dry weight. Furthermore, compared with most other plants, *Lemna* leaves have a low fiber content (e.g., about 5%-about 15% in dry matter) and are highly digestible, even for monogastric animals. This contrasts with the compositions of many crop species (e.g., soy beans, rice, maize) which have fiber contents of approximately 50% and low digestibility.

TABLE 1

Essential Amino Acid Profile of Lemna Protein Concentration

| Essential Amino Acid | Protein (g/100 g) |
|---|---|
| Lysine | 5.9 |
| Leucine | 9.7 |
| Isoleucine | 5.1 |
| Methionine | 2.4 |
| Phenylalanine | 6.3 |
| Threonine | 4.4 |
| Tryptophan | 2.0 |
| Valine | 6.3 |
| Histidine | 2.7 |
| Arginine | 6.8 |

Processing a microcrop (e.g., *Lemna*) may generate a high-protein concentrate product having improved qualities and/or compositions relative to an unprocessed microcrop product (e.g., superior protein content, superior PDCAAS value, superior digestibility, superior amino acid profile, desired fiber content, and/or reduced oxalic acid content). In some embodiments of the present disclosure, processing a microcrop may include blanching a microcrop.

Apparatuses for Blanching a Microcrop

Figure 2:
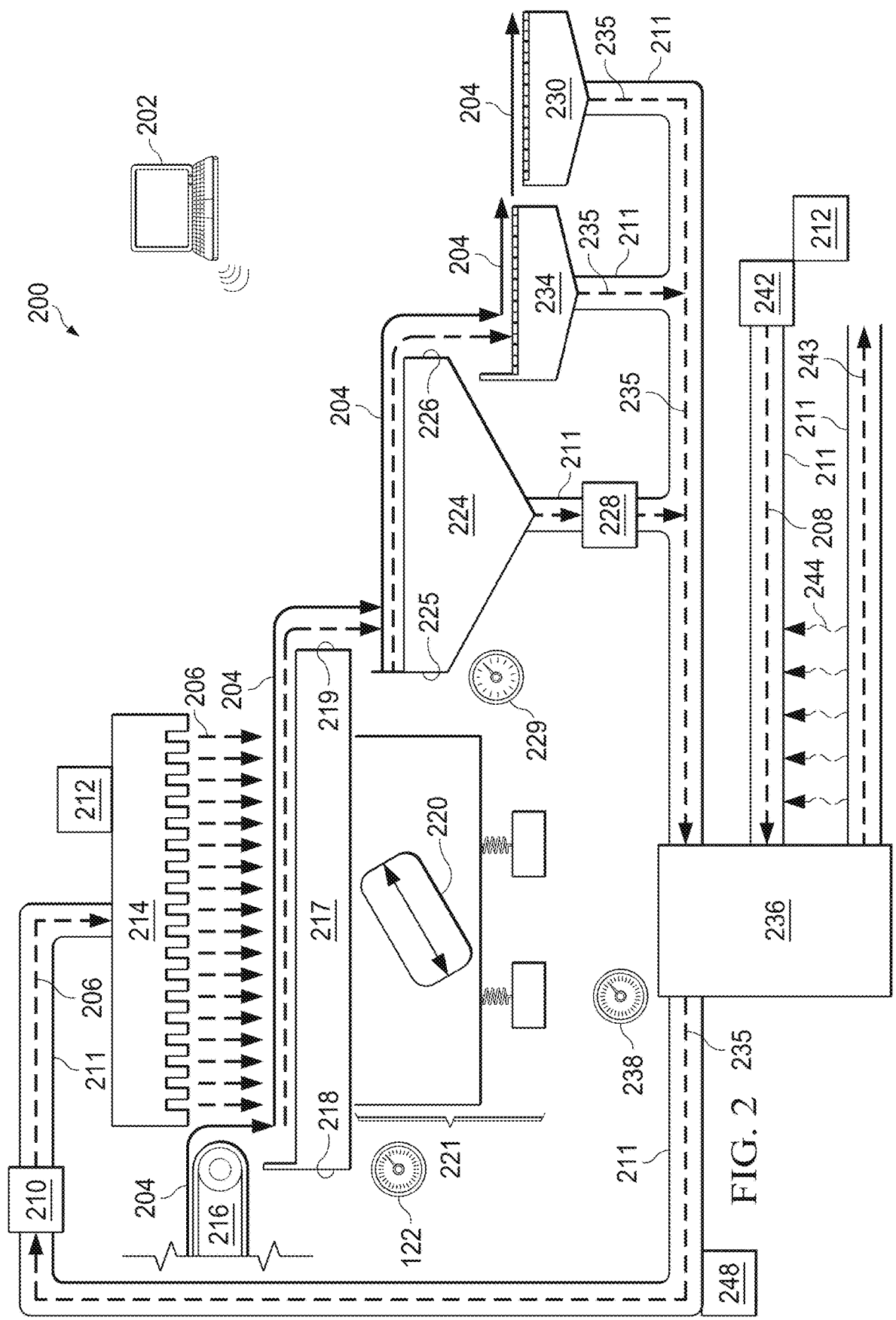
FIG. 2 illustrates an apparatus capable of blanching a biomass, according to a specific example embodiment of the disclosure.

FIGS. 1 and 2 illustrate example embodiments of apparatuses 100/200 for blanching (e.g., continuously blanching) a microcrop, according to some embodiments of the present disclosure. According to some embodiments, a biomass 104/204 may move (e.g., by conveyance, by gravity, by liquid flow) through an apparatus 100/200 at a product flow rate ratio calculated by dividing a pump rate by a feed rate. For example, an apparatus 100/200 performing at a pump rate of 28 liters per min (L/min) and a feed rate of 4 kg per min (kg/min) results in a product flow rate ratio of 7:1. According to some embodiments, an apparatus 100/200 may have a product flow rate ratio of about 10:1, or about 9:1, or about 8:1, or about 7.5:1, or about 7:1, or about 6.5:1, or about 6:1, or about 5.5:1, or about 5:1, or about 4.5:1, or about 4:1, or about 3.5:1, or about 3:1, or about 2.5:1, or about 2:1, or about 1.5:1, or about 1:1, according to some embodiments. According to some embodiments, an apparatus 100/200 may include a central control system 102/202 operable to communicate with one or more elements of the apparatus, monitor one or more conditions (e.g., product flow ratio), and implement adjustments. In some embodiments, a central control system may be a programmable logic controller. A central control system 102/202, in some embodiments, may communicate with a first gauge (e.g., FIG. 2 222), a second gauge (e.g., FIG. 2 229), a collection tank gauge (e.g., FIG. 2 238), a pump and valve system (e.g., FIG. 2 248), or any combination thereof. In some embodiments, a central control system 102/202 may be operable to maintain and/or adjust a product flow rate (e.g., 7:1), a feed rate, a pump rate, or any combination thereof.

As shown in FIGS. 1 and 2, apparatuses 100/200 for blanching a microcrop may include a conveyance mechanism 116/216 and a blanching tray 117/217. According to some embodiments, conveyance mechanism 116/216 may be operable to transport a biomass (e.g., a harvested microcrop, a washed biomass) 104/204 to blanching tray 117/217. Conveyance mechanism 116/216, in some embodiments, may include any mechanism of transporting biomass 104/204 (e.g., *Lemna*) to blanching tray 218. For example, conveyance mechanism 116/216 may comprise a conveyor belt or series of conveyor belts, in some embodiments. In some embodiments, conveyance mechanism 116/216 may include a slide or chute wherein biomass 104/204 enters blanching tray 117/217 at least in part due to gravitational forces.

In some embodiments, a biomass 104/204 may be transported to blanching tray 117/217 at a feed rate. A feed rate may be regulated based on an overall size of an apparatus 100/200 and/or a pump rate to maintain a desired product flow rate ratio (e.g., 7:1), according to some embodiments. A feed rate, in some embodiments, may be about 0.5 kg/min, or about 1 kg/min, or about 1.5 kg/min, or about 2 kg/min, or about 3 kg/min, or about 4 kg/min, or about 5 kg/min, or about 10 kg/min, or about 20 kg/min, or about 50 kg/min, or about 100 kg/min, or about 150 kg/min, or about 200 kg/min, or about 250 kg/min, or about 300 kg/min, or about 350 kg/min, or about 400 kg/min.

As shown in FIGS. 1 and 2, an apparatus 100/200, in some embodiments, may include a source 110/210 operable to provide a blanching solution 106/206 to one or more elements of apparatus 100/200. A source 110/210, in some embodiments, may include a holding tank, a well, a water line, or any other container or system capable of holding and/or transporting a liquid. According to some embodiments, a source 110/210 may contain and/or transport a blanching solution 106/206 comprised of water, ground water, well water, distilled water, deionized water, reverse osmosis water, nanofiltered water, ultra-filtered water, or any combination thereof. In some embodiments, a source 110/210 may contain and/or transport a blanching solution 106/206 comprising at least one dissolved solid (e.g., ash). A source 110/210, in some embodiments, may contain and/or transport a blanching solution 106/206 comprising calcium salt (e.g., calcium chloride, calcium acetate). In some embodiments, a source 110/210 may contain and/or transport a blanching solution 106/206 which was exposed to a microcrop, collected, and re-used (e.g., a recycled blanching solution (e.g., FIG. 2 235)).

As shown in FIGS. 1 and 2, in some embodiments, apparatus 100/200 may include a piping system 111/211. Piping system 111/211 directly or indirectly connect various components of apparatus 100/200 to one another and provide a conduit through which a liquid (e.g., blanching solution, a separated solution, a settling solution) may travel. For example, piping system 111/211 may be directly or indirectly connect source 110/210 to an applicator 114/214 (e.g., shower) such that blanching solution 106/206 may travel from source to applicator. In some embodiments, piping system 111/211 may be composed of metal (e.g., steel, stainless steel, copper, lead), PVC, plastic, or any combination thereof. Piping system 111/211 may be rigid, flexible, or semi-flexible. According to some embodiments, piping system 111/211 may be at least partially insulated. A liquid (e.g., blanching solution 106/206) may travel through piping system 111/211 (e.g., from source 110/210 to applicator 114/214) under the influence of any force (e.g., gravity, pumping, forced air) or combination of forces. Piping system 111/211 may be a single element or a series of elements without deviating from the scope of this disclosure. Moreover, the scope of the present disclosure includes the possibility that additional elements (e.g., gauges, pumps) may be interspersed along piping system 111/211.

According to some embodiments, applicator 114/214 may comprise any element or combination of elements that is operable to permit blanching solution 106/206 to exit applicator 114/214 (e.g., in a controlled flow) and contact a blanching tray 117/217 and/or a biomass 104/204. For example, applicator 114/214, in some embodiments, may be a shower. In some embodiments, applicator 114/214 may be operable to release a blanching solution as a cascade, a shower, a spray, a mist, a fog, a pour, a drip, or any combination thereof. In some embodiments, applicator 114/214 may comprise a body having an input and at least one hole. An input, according to some embodiments may be operable to accept an input source (e.g., piping system 111/211) where the input source is capable of transporting a liquid (e.g., blanching solution 106/206). Applicator 114/214 may be operable in some embodiments, to direct a stream of liquid (e.g., blanching solution) from the input to the at least one hole such that at least some of the liquid exits the applicator through the at least one hole. An at least one hole may be of any size and/or shape. In some embodiments an at least one hole may be a perforated screen, a porous material (e.g., polyester filter cloth), or any combination thereof. According to some embodiments, applicator 114/214 may be configured to cascade blanching solution in a selected droplet size and/or volume (e.g., a stream size) through at least one hole. For example, in some embodiments, a applicator 114/214 may be configured to cascade blanching solution 106/206 in droplet or stream sizes of about 5 µL, or about 10 µL, or about 20 µL, or about 30 µL, or about 40 µL, or about 50 µL, or about 100 µL, or about 200 µL. According to some embodiments, applicator 114/214 may be configured such that blanching solution 106/206 cascades at a droplet size and rate such that a stream of blanching solution exits applicator 114/214. In some embodiments, applicator 114/214 may comprise a body comprising a box, an input connected to a top side of the box and accepting an input source, and at least one hole on the bottom side of the box. In some embodiments, the at least one hole may be 3/16 in (about 0.5 cm) in size. According to some embodiments, a hole may be by a layer of porous material, for example a polyester filter cloth (e.g., 3/16 in (about 0.5 cm) thick).

In some embodiments, applicator 114/214 may be operable to cascade blanching solution 106/206 in a controlled flow, such that a selected volume of blanching solution is cascaded over a selected period of time. For example, applicator 114/214 may be operable to cascade blanching solution 106/206 at a rate of at least 0.5 L/min, or at least 1 L/min, or at least 2 L/min, or at least 3 L/min, or at least 4 L/min, or at least 5 L/min, or at least 6 L/min, or at least 7 L/min, or at least 8 L/min, or at least 10 L/min, or at least about 25 L/min, or at least about 50 L/min, or at least about 100 L/min, or at least about 200 L/min, or at least about 300 L/min, or at least about 500 L/min, or at least about 750 L/min, or at least about 1000 L/min, or at least about 1500 L/min, or at least about 2000 L/min, or at least about 2250 L/min, or at least about 2500 L/min, in some embodiments.

An apparatus for blanching (e.g., continuously blanching) a microcrop 100/200, in some embodiments, may further include a heating element 112/212 operable to heat blanching solution 106/206, a separated solution (e.g., FIG. 2 235, a dilution solution (e.g. FIG. 2 208), or any combination thereof. A heating element 112/212 may be placed in various locations throughout apparatus 100/200 without departing from the scope of the instant disclosure. For example, in some embodiments, a heating element, may be directly or indirectly connected to source 110/210, or piping system 111/211, or applicator 114/214, or a collection tank 136/236, or a dilution source 142/242, or any combination thereof. A blanching solution 106/206, a separated solution (e.g., FIG. 2 235, a dilution solution (e.g. FIG. 2 208), or any combination thereof may enter, bypass, or otherwise interact with heating element 112/212 to form a heated blanching solution, according to some embodiments. As shown in FIG. 1, in some embodiments, heating element 112 may be incorporated within or adjacent to source 110 (e.g., heating element incorporated within a holding tank) such that blanching solution 106 may be heated at or adjacent to source 110. According to some embodiments, heating element 112/212 may be incorporated in or adjacent to one or more points along piping system 111/211 such that blanching solution 106/206 may be heated while traveling from source 110/210 to applicator 114/214. As shown in FIG. 2, in some embodiments, heating element 112/212 may be incorporated in or adjacent to applicator 114/214 such that blanching solution 106/206 may be heated after traveling through pipe 111/211. In some embodiments, apparatus 100/200 may have multiple heating elements, with a location of each heating element selected independently. For example, in some embodiments, apparatus 100/200 may have a first heating element incorporated in or adjacent to applicator 114/214 and a second heating element incorporated in or adjacent to a dilution source 142/242.

Heating element 112/212 may be operable to heat blanching solution 106/206 to a temperature of at least 60° C., or at least 65° C., or at least 70° C., or at least 75° C., or at least 80° C., or at least 85° C., or at least 90° C., or at least 95° C., or at least 100° C., according to some embodiments.

According to some embodiments, blanching tray 117/217 may be oriented to receive a volume of blanching solution 106/206 exiting applicator 114/214 (e.g., through at least one hole). Blanching tray 117/217 may be operable to contain biomass 104/204 (e.g., first portion, second portion) and/or a volume of blanching solution 106/206. Blanching tray 117/217 may have any dimensions and composition suitable for its operability. According to some embodiments, a blanching tray 117/217 may be square or rectangular in shape. In some embodiments, blanching tray 117/217 may have a first side 118/218 opposite a second side 119/219 and a third side opposite a fourth, where the first side, third side, and fourth side each have a first height and the second side has a second height which is less than the first height. For example, in some embodiments, a second side may be a weir operable to maintain a desired volume of a blanching solution in a blanching tray. According to some embodiments, a top edge of a second side may include one or more notches. A blanching tray 117/217, in some embodiments, may have a depth of about 0.5 cm, or about 1 cm, or about 2 cm, or about 3 cm, or about 4 cm, or about 5 cm, or about 6 cm, or about 8 cm, or about 10 cm, where "about" may be, for example, plus or minus 1 cm. According to some embodiments, a second side of a blanching tray may have a height about 0.5 cm less than a height of a first side of the blanching tray, or about 1 cm less, or about 2 cm less, or about 3 cm less, or about 4 cm less, or about 5 cm less than a height of a first side, a third side, and a fourth side of the blanching tray, where "about" may be, for example, plus or minus 0.5 cm.

According to some embodiments, blanching tray 117/217 may be transiently (e.g., placed on a surface of) or fixedly attached to a transport system such as a conveyor belt. In some embodiments, such a transport system may be used to drive blanching tray 117/217 in a direction such that cascading blanching solution 106/206 from applicator 114/214 enters blanching tray 117/217. In other embodiments, blanching tray 117/217 may be stationary and applicator 114/214 may be positioned such that at least a portion of a cascade of blanching solution 106/206 exiting applicator 114/214 enters blanching tray 117/217.

As shown in FIGS. 1 and 2, apparatus 100/200 may include a vibratory mechanism 120/220 capable of vibrating blanching tray 117/217 to generate a net motion (e.g., a wave action) of a volume of blanching solution 106/206 within blanching tray 117/217. In some embodiments, vibratory mechanism 120/220 may be directly connected to or incorporated into a design of blanching tray 117/217. In other embodiments, vibratory mechanism 120/220 may be adjacent to blanching tray 117/217. For example, vibratory mechanism 120/220 may include a platform suspended on a system of springs 121/221 such that blanching tray 117/217 may be attached (e.g., fixedly, removably) to the platform and thereby exposed to vibrational forces (e.g., oscillation) generated. A vibratory mechanism 120/220, in some embodiments, may be installed directly on a platform being vibrated or indirectly coupled to the platform being vibrated. In some embodiments, a vibratory mechanism 120/220 may comprise one or more one-axis motors, one or more stepper motors, one or more servo motors, one or more axis motor drives, one or more weights (e.g., balanced, unbalanced), or any combination thereof.

According to some embodiments, vibratory mechanism 120/220 may generate a net motion of a volume of blanching solution 106/206. A net motion of a volume of blanching solution 106/206, in some embodiments, may generate a motive force capable of directing (e.g., propelling) biomass 104/204 from a first side of blanching tray 117/217 to a second side of blanching tray, where the first side is opposite the second side. In some embodiments, a second side of a blanching tray may have a height less than a height of a first side of the blanching tray (e.g., a weir); thereby allowing a volume of blanching solution and/or a mass of biomass to exit the blanching tray after it is transported from the first side 118/218 to the second side 119/219 of the blanching tray.

In some embodiments, a net motion of a volume of blanching solution 106/206 may include a disturbance on a top surface of the volume of blanching solution (e.g., a wave action, a ridge, a swell, a wave-like action). A disturbance on a top surface of the volume of blanching solution (e.g., a wave action, a ridge, a swell) may be capable of depositing any quantity of blanching solution onto a top surface (i.e., a surface facing away from a bottom surface of blanching tray 117/217) of biomass 104/204. A net motion (e.g., wave action) of a volume of blanching solution 106/206 may result in a top surface (i.e., a surface facing away from a bottom surface of blanching tray 117/217) of biomass 104/204 to be covered by a quantity of blanching solution 106/206 (e.g., repeatedly covered, partially covered). For example, a net motion of a volume of blanching solution 106/206 (e.g., having a wave action) may result in a top surface of biomass 104/204 being repeatedly exposed to the volume of blanching solution as a disturbance of the blanching solution (e.g., one or more waves) rolling across blanching tray 117/217. According to some embodiments, a mass of biomass 104/204 and/or a volume of blanching solution 106/206 may exit blanching tray 117/217 after being propelled from a first side of blanching tray 118/218 to a second side of blanching tray. Exposure of a biomass 104/204 to a net motion (e.g., disturbance through wave action) of a volume of blanching solution 106/206 may result in more uniform blanching of the biomass.

According to some embodiments, an apparatus for blanching (e.g., continuously blanching) a microcrop 100/200 may include a first gauge 122/222. In some embodiments, a first gauge 122/222 may be incorporated into, or attached (e.g., removably, fixedly), or adjacent to blanching tray 118/218. In some embodiments, a first gauge 122/222 may be operable to measure one or more of the following: a volume of blanching solution 106/206 within blanching tray 118/218; a mass of biomass 104/204 within blanching tray; a volume of blanching solution exiting blanching tray; a mass of biomass exiting blanching tray; a temperature of blanching solution within blanching tray (e.g., average temperature, at specific locations); a temperature of blanching solution exiting blanching tray; a rate of net motion; a height and frequency of a displacement of a volume of blanching solution (e.g., wave action); a displacement of a blanching tray (e.g., relative to a set point on a platform); a dissolved solids content (e.g., ash) of blanching solution. In some embodiments, first gauge 122/222 may be capable of communicating with (e.g., directly; through a central control system) heating element 112/212, applicator 114/214, vibratory mechanism 120/220, a tank 136/236, a pump and valve system 148/248, or any combination thereof such that various conditions may be adjusted including: a rate of blanching solution cascading from applicator 114/214, a temperature of blanching solution 106/206 exiting applicator, a rate of net motion, a dilution rate (i.e., rate of diluting a separated solution), or any combination thereof. According to some embodiments, a first gauge 122/222 may communicate with (e.g., directly, through a central control system) with one or more components of apparatus 100/200 to maintain or adjust a desired product flow rate ratio (e.g., 7:1) or a dilution rate (e.g., 2.5:1).

As shown in FIG. 1, according to some embodiments, after being propelled from a first side of blanching tray 118 to a second side of blanching tray 119, where the first side is opposite the second side, a mass of biomass 104 and/or a volume of blanching solution 106 may exit the blanching tray (e.g., via a weir) and enter a dewatering mechanism 134. A dewatering mechanism, in some embodiments, may be operable to separate blanching solution 106 from a blanched biomass 146. A blanching solution 106 may be separated from a blanched biomass 146, in some embodiments, using gravity separation, draining, an inclined screen, a vibratory screen, filtration, a decanter centrifuge, a belt press, a fan press, a rotary press, a screw press, a filter press, a finisher press, or any combination thereof.

As shown in FIG. 2, according to some embodiments, after being propelled from a first side of blanching tray 118 to a second side of blanching tray 119, where the first side is opposite the second side, a mass of biomass 204 and/or a volume of blanching solution 206 may exit the blanching tray (e.g., via a weir) and enter a settling tank 224. A settling tank 224 may be, directly or indirectly, connected to blanching tray 218 in such a way that a mass of biomass 204 and a volume of blanching solution 206 may flow into settling tank 224 (e.g., gravity flow, propulsion). According to some embodiments, a settling tank 224 may be, oriented relative to blanching tray 218 in such a way that a mass of biomass 204 (e.g., first portion, second portion) and a volume of blanching solution 206 may flow into settling tank 224 (e.g., gravity flow, propulsion). Settling tank 224 may be operable to allow contaminants and/or debris to become dislodged from a mass of biomass 204 and sink below a surface of a settling solution. In some embodiments, a settling tank 224 may be operable to remove non-buoyant solids from biomass 204. Non-buoyant solids, in some embodiments, may include fresh water arthropods or mollusks (e.g., gammarus and snails). Blanching unwanted lifeforms, in some embodiments, may result in a buoyancy change of those lifeforms such that previously buoyant lifeforms become non-buoyant.

Settling tank 224 may have any dimensions and composition suitable for its operability. According to some embodiments, a settling tank may be square or rectangular in shape (e.g., when viewed from above). In some embodiments, settling tank 224 may have a first side 225 opposite a second side 226 and a third side opposite a fourth, where the first side, third side, and fourth side each have a first height and the second side 226 has a second height which is less than the first height. For example, in some embodiments, a second side 226 may be a weir operable to maintain a desired volume of a blanching solution in a blanching tray. According to some embodiments, a top edge of a second side may include one or more notches. A settling tank 224, in some embodiments, may have a depth of about 5 cm, or about 7.5 cm, or about 10 cm, or about 12.5 cm, or about 15 cm, or about 17.5 cm, or about 20 cm, or about 22.5 cm, or about 25 cm, or about 30 cm, or about 35 cm, or about 40 cm, or about 45 cm, or about 50 cm, where "about" may represent, for example, plus or minus 2 cm.

In some embodiments, settling tank 224 may contain a volume of a settling solution. A settling solution may include any liquid having characteristics which permit contaminants and/or debris to sink away from a top surface of the settling solution. According to some embodiments, a settling solution may comprise a blanching solution 206. A settling solution, in some embodiments, may comprise water, ground water, well water, distilled water, deionized water, reverse osmosis water, nanofiltered water, ultra-filtered water, or any combination thereof. In some embodiments, a settling solution may be selected to have a specific viscosity.

In some embodiments, settling tank 224 may include one or more sloping sides and/or a sloping bottom which may aid in removal of contaminants, debris, or non-buoyant solids that sink below a surface of a settling solution. Settling tank 224, in some embodiments, may include filters or screens that may aid in separating a biomass from debris, contaminants, and/or non-buoyant solids. For example, in some embodiments, a settling tank may include a screen across a surface of the settling tank but below a top surface of a settling solution. A screen, in some embodiments, may include a mesh size small enough to retain a biomass but large enough to allow at least some debris, contaminants, and/or non-buoyant solids to pass through. In some embodiments, a screen may be capable of vibratory motion such that a biomass may be transported from a first side 225 of a settling tank to a second side 226 of the settling tank, where the first side and the second side are opposite. According to some embodiments, a mass of debris, contaminant, and/or non-buoyant solids may be expelled from a settling tank 224 (e.g., from a bottom of the settling tank) along with a volume of settling solution. A filter 228 may collect the debris, contaminants, and/or non-buoyant solids and a stream of settling solution may be collected (e.g., as a separated solution 235) in a collection tank 236, in some embodiments.

According to some embodiments, debris, contaminants, and/or non-buoyant solids may settle to a bottom of a settling tank. Debris, contaminant, and/or non-buoyant solids may be recycled (e.g., used in a microcrop cultivation system, fish food), in some embodiments.

In some embodiments, settling tank 224 may comprise a propulsion mechanism operable to convey a biomass (e.g., first portion, second portion) from a first side of settling tank 225 to a second side of settling tank 226, where the first side and the second side are opposite one another. In some embodiments, a propulsion mechanism may include gravity, paddle wheels, bubbling, submerged or surface water jets, submerged mixers, a vibratory mechanism, or any combination thereof. In some embodiments, a propulsion mechanism may include a pump operable to pump a settling solution from an entry point to an exit point of settling tank.

According to some embodiments, settling tank 224 may be operable to cool a biomass. For example, a settling solution within settling tank 224 may have a temperature less than a temperature of a blanching solution 206 (e.g., below about 60° C.) or less than an ambient temperature (e.g., about 23 C). In some embodiments, a settling solution may have a temperature below about 90° C., or below about 80° C., or below about 70° C., or below about 60° C., or below about 50° C., or below about 40° C., or below about 30° C., or below about 20° C. at the time of use. A settling solution, in some embodiments, may have a temperature between about 20° C. and about 80° C., or between about 40° C. and about 80° C., or between about 40° C. and about 60° C., or between about 20° C. and about 40° C., or between about 20° C. and about 30° C. at the time of use.

In some embodiments, an apparatus for blanching (e.g., continuously) a microcrop 200, may include a second gauge 229. In some embodiments, a second gauge 229 may be incorporated into, or attached (e.g., removably, fixedly), or adjacent to settling tank 224.

In some embodiments, a second gauge 229 may be operable to monitor, maintain, and/or adjust a desired product flow rate ratio (e.g., 7:1). A second gauge 229, in some embodiments, may be operable to measure one or more of the following: a volume of settling solution within a settling tank 224; a mass of biomass 204 within settling tank; a volume of settling solution exiting settling tank; a mass of biomass exiting settling tank; a temperature of settling solution within settling tank (e.g., average temperature, at specific locations); a temperature of settling solution exiting settling tank; a dissolved solids content (e.g., ash) of settling solution. In some embodiments, second gauge 229 may be capable of communicating with (e.g., directly; through a central control system) heating element 112/212, applicator 114/214, vibratory mechanism 120/220, a tank 136/236, a pump and valve system, or any combination thereof such that various conditions may be adjusted. According to some embodiments, a second gauge 229 may communicate with (e.g., directly, through a central control system) with one or more components of apparatus 100/200 to maintain or adjust a desired product flow rate ratio (e.g., 7:1) or a dilution rate (e.g., 2:1).

As shown in FIG. 2, after being propelled from a first side 225 of settling tank to a second side 226 of settling tank, where the first side is opposite the second side, a mass of biomass 204 and/or a volume of settling solution may exit the settling tank and enter a dewatering mechanism 234. As shown in FIG. 1, in some embodiments, after being propelled from a first side 118 of blanching tray to a second side 119 of blanching tray, where the first side is opposite the second side, a mass of biomass 204 and/or a volume of blanching solution 106 may exit the blanching tray and enter a dewatering mechanism 234. Moreover, in some embodiments, a biomass 204 may be directly deposited into a dewatering mechanism 234 without traveling from a first side to a second side of a blanching tray or a settling tank. For example, in some embodiments, a blanching tray containing a biomass and a blanching solution may be directly emptied (e.g., chute feed, gravity feed) into a dewatering mechanism without departing from the scope of the instant disclosure. A dewatering mechanism, in some embodiments, may be operable to separate blanching solution 106, a settling solution, a rinsing solution, or any combination thereof (individually and collectively "a separated solution" 135/235) from a blanched biomass 146. A dewatering mechanism 234, in some embodiments, may include using gravity separation, draining, an inclined screen, a vibratory screen, filtration, a decanter centrifuge, a belt press, a fan press, a rotary press, a screw press, a filter press, a finisher press, or any combination thereof.

As shown in FIGS. 1 and 2, in some embodiments, a separated solution 135/235 may be collected and reused/ recycled. According to some embodiments, as shown in FIGS. 1 and 2, a separated solution 135/235 may be transported (e.g., gravity, pumping) to a collection tank 136/236. A collection tank 136/236 may have any size, shape, dimensions, or composition suitable for collecting and retaining liquid. A separated solution 135/235 within a collection tank 236 may be stationary or moving (e.g., agitation, propulsion). In some embodiments, an apparatus 100/200 may have a single tank that may be operable to function as both a source 110/210 and a collection tank 136/236.

As shown in FIGS. 1 and 2, an apparatus for blanching a microcrop 100/200 may include a collection tank gauge 138/238. In some embodiments, a collection tank gauge 138/238 may be operable to monitor, maintain, and/or adjust a desired product flow rate ratio (e.g., 7:1). A collection tank gauge 138/238 may be operable, in some embodiments, to monitor a composition (e.g., total dissolved solids) and/or temperature of a separated solution. Monitoring a composition of a separated solution may include monitoring one or more of the following: total dissolved solids, total solids, turbidity, electrical conductivity, nutrient (e.g., nitrogen) composition, salinity, pH. A collection tank gauge 238, in some embodiments, may communicate (e.g., directly, indirectly) with a pump and valve system 248 in order to regulate a composition of a separated solution (e.g., by adjusting a dilution rate).

In some embodiments, collection tank gauge 138/238 may be capable of communicating with (e.g., directly; through a central control system) with one or more components of apparatus 100/200 (e.g., a pump and valve system, a dilution tank) to maintain or adjust a total dissolved solids content of a volume of separated solution 135/235 stored in tank 136/236. For example, a collection tank gauge 138/238, in some embodiments, may communicate with one or more components of apparatus 100/200 to maintain or adjust a total solids content of a volume of separated solution 135/ 235 and/or a volume of a blanching solution 106/206 at a value of less than 0.5% (w/w), or less than 1% (w/w) or less than 2% (w/w), or less than 4% (w/w), or less than 6% (w/w) or less than 8% (w/w), or less than 10% (w/w). According to some embodiments, a collection tank gauge 138/238, in some embodiments, may communicate with one or more components of apparatus 100/200 to maintain or adjust a turbidity value (e.g., relative to absorbance of a 500 nm light source where 1.0 is equivalent to 10% absorbance and 10.0 is equivalent to 100% absorbance) of a volume of separated solution 135/235 and/or a volume of a blanching solution 106/206 at a value of less than about 0.5, or less than about 0.75, or less than about 1.0, or less than about 1.25, or less than about 1.5, where about may represent plus or minus 5%. In some embodiments, a collection tank gauge 138/238, in some embodiments, may communicate with one or more components of apparatus 100/200 to maintain or adjust an electrical conductivity value of the separated solution at/to a value of less than about 2000 µS/cm, or less than about 2500 µS/cm, or less than about 3000 µS/cm, or less than about 3500 µS/cm, or less than about 4000 µS/cm, or less than about 4500 µS/cm, or less than about 5000 µS/cm, or less than about 5500 µS/cm, or less than about 6000 µS/cm, where "about" may represent plus or minus 250 µS/cm. According to some embodiments, a collection gauge 138/238 may communicate with (e.g., directly, through a central control system) with one or more components of apparatus 100/200 to maintain or adjust a desired product flow rate ratio (e.g., 7:1).

According to some embodiments, an apparatus 100/200 may include a filter operable to filter a separated solution. A filter may be operable, according to some embodiments, to achieve coarse filtration (e.g., gravity filtration, vibratory screen filtration), fine filtration (e.g., microfiltration, ultrafiltration, nanofiltration, reverse osmosis filtration), or any combination thereof. A filtered separated solution may be recycled as a wash solution, as a growth medium in the cultivation of a microcrop, as a blanching solution, as a settling solution, as a rinsing solution, or any combination thereof. In some embodiments, a blanching waste (e.g., retentate from a filtration method) may be recycled as part of a growth medium (e.g., as a nutrient source) in a cultivation of a microcrop.

In some embodiments, a separated solution 135/235 may be diluted prior to recycling (e.g., recycling as a blanching solution). Dilution of a separated solution 135/235 may be desirable to adjust a composition of the separated solution (e.g., dissolved solids content, turbidity). A diluted separated solution may be recycled as a blanching solution 106/206, as a wash solution (e.g., FIG. 4 457) as a settling solution, as a rinsing solution, or any combination thereof, in some embodiments. In some embodiments, a discard solution 143/243 may be recycled as a growth medium in the cultivation of a microcrop (e.g., FIG. 4 450).

As shown in FIGS. 1 and 2, an apparatus for blanching a microcrop may include a dilution source 142/242 operable to store and release a dilution solution 108/208, in some embodiments. A dilution solution 108/208, according to some embodiments, may include water, ground water, well water, distilled water, deionized water, reverse osmosis water, nanofiltered water, ultra-filtered water, or any combination thereof. A dilution source 142/242, in some embodiments, may include a holding tank, a well, a water line, or any other container or system capable of holding a liquid. In some embodiments, diluting a separated solution may include discarding a volume of separated solution (i.e., a discard solution 143/243) from a collection tank. A discard solution 143/243 may have a volume equal to a volume of dilution solution necessary to achieve a desired composition of dissolved solids (e.g., ash), according to some embodiments. In some embodiments, a discard solution 143/243 may have a volume higher than a volume of dilution solution necessary to achieve a desired composition of dissolved solids (e.g., ash). A rate of discarding a volume of separated solution from a collection tank may be regulated by a collection tank gauge (e.g., total tank volume)

According to some embodiments, a separated solution 135/235 and/or a blanching solution 106/206 in tank 136/236 may be diluted to comprise a desired composition of dissolved solids (e.g., ash) and/or total solids. In some embodiments, a volume of separated solution 135/235 and/or a volume of a blanching solution 106/206 in tank 136/236 may be diluted to have a total solids content at a value of less than 0.5% (w/w), or less than 1% (w/w) or less than 2% (w/w), or less than 4% (w/w), or less than 6% (w/w) or less than 8% (w/w), or less than 10% (w/w). According to some embodiments, a separated solution 135/235 in tank 136/236 may be diluted to have a turbidity value (e.g., relative to absorbance of a 500 nm light source where 1.0 is equivalent to 10% absorbance and 10.0 is equivalent to 100% absorbance) of a volume of separated solution 135/235 and/or a volume of a blanching solution 106/206 at a value of less than about 0.5, or less than about 0.75, or less than about 1.0, or less than about 1.25, or less than about 1.5, where about may represent plus or minus 5%. In some embodiments, a separated solution 135/235 and/or a blanching solution 106/206 in tank 136/236 may be diluted to have an electrical conductivity value of less than about 2000 µS/cm, or less than about 2500 µS/cm, or less than about 3000 µS/cm, or less than about 3500 µS/cm, or less than about 4000 µS/cm, or less than about 4500 µS/cm, or less than about 5000 µS/cm, or less than about 5500 µS/cm, or less than about 6000 µS/cm, where "about" may represent plus or minus 250 µS/cm.

In some embodiments, a separated solution 135/235 in tank 136/236 may be diluted relative to a biomass feed rate. For example, an apparatus 100/200 with a feed rate of 4 kg/min may have a dilution rate of a separated solution 135/235 in tank 136/236 of 8 L/min resulting in a dilution to feed ratio of 2:1. According to some embodiments, an apparatus 100/200 may have a feed to dilution ratio of about 4:1, or about 3.5:1, or about 3:1, or about 2.5:1, or about 2:1, or about 1.5:1, or about 1:1, according to some embodiments.

As shown in FIGS. 1 and 2, in some embodiments, an apparatus for blanching (e.g., continuously) a microcrop 100/200 may include a pump and valve mechanism 148/248. According to some embodiments, a pump and valve mechanism 148/248 may be operable to propel one or more of a blanching solution, a settling solution, a rinsing solution, a separated solution, and a dilution solution within apparatus 100/200. In some embodiments, a pump and valve mechanism 148/248 may communicate with a first gauge, a second gauge, a collection tank gauge 138/238, or any combination thereof. According to some embodiments, a pump and valve mechanism 148/248 may communicate with (e.g., directly, through a central control system) with one or more components of apparatus 100/200 to maintain or adjust a desired product flow rate ratio (e.g., 7:1).

As shown in FIGS. 1 and 2, apparatus 100/200 may include a heat exchanger 144/244. According to some embodiments, a heat exchanger 144/244 (e.g., thermal energy exchange mechanisms) may decrease an overall energy input required for production of high-concentration protein product (e.g., protein flake) from a microcrop (e.g.,

*Lemna, Wolffia*). According to some embodiments, a heat exchanger 144/244 may include a flow system wherein a stream of discard solution 143/243 from collection tank 136/236 (i.e., a donor stream) and a dilution solution stream (i.e., recipient stream) are adjacent such that thermal energy exchange may occur. In some embodiments, a dilution solution stream (i.e., a recipient stream) may have a cooler temperature and thereby a lower thermal energy than a donor stream (e.g., a discard solution stream 143/243 which retains heat from a blanching solution). According to some embodiments, a heat exchanger may include a flow system (e.g., a series of pipes composed of convective material) such that a dilution solution stream (i.e., a recipient stream) may absorb at least some thermal energy from a discard solution stream 143/243 (i.e., a donor stream). In some embodiments, a heat exchanger 144/244 may result in increasing a temperature of a dilution solution stream and/or a diluted separated solution in tank 136/236. In some embodiments, a heat exchanger 144/244 may reduce an amount of energy required for heating a recycled solution in heating element 212.

As shown in FIG. 2, according to some embodiments, after being separated from a blanching solution 206 and/or a settling solution, a blanched biomass 246 may be conveyed to a rinsing mechanism 230. A rinsing mechanism 230 may be, directly or indirectly, connected to dewatering mechanism 234 in such a way that a blanched biomass 246 may be conveyed into rinsing mechanism 230 by gravity or propulsion.

In some embodiments, a rinsing mechanism 230 may be operable to remove unwanted dissolved solids from a blanched biomass 246. Rinsing mechanism 230 may have any dimensions and composition suitable for its operability. In some embodiments, a rinsing mechanism may include a sprinkler and a vibratory screen. According to some embodiments, a rinsing mechanism may include a rinsing tank having any suitable dimensions of shape. A rinsing tank 230, in some embodiments, may have a depth of at least about 5 cm in, or at least about 10 cm, or at least about 15 cm, or at least about 20 cm, or at least about 25 cm where "about" may be, for example, plus or minus 3 cm. In some embodiments, a rinsing mechanism 230 may be capable of containing a blanched biomass 246 and/or a volume of a rinsing solution. According to some embodiments, a rinsing mechanism 230 (e.g., rinsing tank) may be operable to receive a rinsing solution such that the rinsing solution contacts at least one surface of a blanched biomass 246 within the rinsing mechanism. In some embodiments, a rinsing mechanism 230 (e.g., rinsing tank) may contain a volume of a rinsing solution such that a blanched biomass 246 floats on a surface of the rinsing solution. In other embodiments, a rinsing mechanism may include a sprinkler mechanism such that a volume of rinsing solution is deposited on at least one surface of a blanched biomass 246. A rinsing mechanism, in some embodiments, may further comprise a vibratory screen such that at least some of a rinsing solution may be removed from a blanched biomass.

According to some embodiments, a rinsing solution may include water, distilled water, reverse osmosis water, nanofiltered water, a blanching solution 206, a settling solution, a recycled blanching solution, a recycled settling solution, a recycled rinsing liquid, or any combination thereof. According to some embodiments, a rinsing solution may be sterilized (e.g., UV radiation, filtration, heating).

Rinsing mechanism 230, in some embodiments, may be operable to cool a blanched biomass 246. For example, a rinsing solution within rinsing tank 230 may have a temperature less than a temperature of a blanching solution 206, or less than an ambient temperature. In some embodiments, a rinsing solution may have a temperature below room temperature (e.g., about 12° C.) at the time of use. In some embodiments, a rinsing solution may have a temperature below about 50° C., or below about 40° C., or below about 30° C., or below about 20° C., or below about 15° C., or below about 10° C., or below about 5° C., or below about 2° C., or below about 1° C., or below about 0° C. at the time of use.

In some embodiments, rinsing mechanism 230 may comprise a propulsion mechanism operable to convey a blanched biomass from a first side of the rinsing mechanism to a second side of the rinsing mechanism, where the first side and the second side are opposite one another. For example, in some embodiments, a rinsing mechanism may include a propulsion system and a rinsing tank where the propulsion mechanism propels a blanched biomass from a first side of the rinsing tank to a second side of the rinsing tank. In other embodiments, a rinsing mechanism 230 may include a vibratory screen and a sprinkler system, where the vibratory screen propels the blanched biomass from a first side to a second side. According to some embodiments a propulsion mechanism of a rinsing mechanism may include gravity, paddle wheels, bubbling, submerged or surface water jets, submerged mixers, a vibratory mechanism, or any combination thereof.

As shown in FIGS. 1 and 2, in some embodiments, a rinsing mechanism 230 may include components capable of separating a volume of rinsing solution from a blanched biomass (e.g., vibratory screen) to generate a separated solution 235. According to some embodiments, a separated solution may be collected in a collection tank 236, diluted, filtered, recycled, or any combination thereof.

Methods for Generating a High-concentration Protein Product By Blanching of a Microcrop Cultivation of a Microcrop In some embodiments a microcrop may be asexually propagated (e.g., cultivated) by contacting the microcrop with a first medium (e.g., an aqueous nutrient composition, a growth medium) under conditions that permit expansion. A microcrop may be cultivated (e.g., FIG. 3 350, FIG. 4 450) in a bioreactor system, according to some embodiments. A bioreactor system may contain a first medium (e.g., a growth medium) comprising water and/or a nutrient composition, according to some embodiments. A nutrient composition, in some embodiments, may include at least one of nitrogen, phosphorus, potassium, and calcium. In some embodiments, a first medium may comprise dissolved gaseous oxygen and/or dissolved gaseous carbon dioxide. According to some embodiments, a first medium may be configured to have an increased calcium composition (e.g., an increased calcium growth medium). For example, an increased calcium first medium may comprise a calcium concentration of ≥ about 120 parts per million (ppm), or ≥ about 115 ppm, or ≥ about 110 ppm, or ≥ about 105 ppm, or ≥ about 100 ppm, or ≥ about 95 ppm, or ≥ about 90 ppm, or ≥ about 85 ppm, or ≥ about 80 ppm, or ≥ about 75 ppm, or ≥ about 70 ppm, or ≥ about 65 ppm, or ≥ about 60 ppm, or ≥ about 55 ppm, or ≥ about 50 ppm, or ≥ about 45 ppm, or ≥ about 40 ppm, or ≥ about 35 ppm, or ≥ about 30 ppm, or ≥ about 25 ppm, or ≥ about 20 ppm, where "about" constitutes plus or minus 10%. In some embodiments, an increased calcium first medium may comprise a calcium concentration of about 20 ppm to about 120 ppm, about 25 ppm to about 120 ppm, or about 30 ppm to about 120 ppm, or about 40 ppm to about 120 ppm, or about 50 ppm to about 120 ppm, or about 60 ppm to about 120 ppm, or about 70 ppm to about 120 ppm, or about 80 ppm to about 120 ppm, or about 20 ppm to about 100 ppm, or about 30 ppm to about 100 ppm, or about 40 ppm to about 100 ppm, or about 50 ppm to about 100 ppm, or about 60 ppm to about 100 ppm, or about 70 ppm to about 100 ppm, or about 80 ppm to about 100 ppm. An increased calcium first medium, according to some embodiments, may comprise a calcium concentration of at least about 20 ppm (e.g., ±10%). In some embodiments an increased calcium first medium comprises at least 100 ppm calcium. A bioreactor system may be configured to insert additional nutrients (e.g., nitrogen, phosphorus, potassium, calcium) or gases (e.g., oxygen; carbon dioxide) into the first medium at specified time indicators or in response to sensor readings. In some embodiments, a calcium may comprise calcium, calcium carbonate, calcium oxalate, calcium oxide, calcium citrate, calcium carbide, calcium phosphate, calcium sulfate, calcium chloride, or combinations thereof.

In some embodiments, a first medium may comprise one or more anti-photosynthetic dyes that are configured to attenuate photosynthetically active radiation within the growth medium. The one or more anti-photosynthetic dyes may be added at a sufficient volume or concentration to inhibit growth of at least one other aquatic organism (e.g., submerged aquatic species, phytoplankton, phytoalgae, epiphytic algae), according to some embodiments. An anti-photosynthetic dye may include at least one of (n-ethyl-n-[4-[[4-[ethyl[(3-sulfophenyl)methyl]amino]-phenyl](2-sulfophenyl)-methylene)]2,5-cyclohexadien-1-ylidene]-3-sulfobenzenemethanaminium hydroxide inner salt, disodium salt, (Colour Index Acid Blue 9 (Ref. No. 42090)), trisodium (4E)-5-oxo-1-(4-sulfonatophenyl)-4-[(4-sulfonatophenyl)hydrazono]-3-pyrazolecarboxylate (Colour Index Acid Yellow 23 (Ref. No. 19140)), diazanium; 2-[[4-[ethyl-[(3-sulfonatophenyl)methyl]amino]phenyl]-[4-[ethyl-[(3-sulfonatophenyl) methyl]azaniumylidene]cyclohexa-2,5-dien-1-ylidene]methyl]benzenesulfonate (Colour Index Acid Blue 34 (Ref. No. 42645)); benzyl-[4-[[4-[benzyl(ethyl)amino]phenyl]-(5-hydroxy-2,4-disulfophenyl)methylidene]cyclohexa-2,5-dien-1-ylidene]-ethylazanium (Colour Index Acid Blue 5 (Ref. No. 42052)); disodium-2-(1,3-dioxoinden-2-yl)quinoline-6,8-disulfonate (Colour Index Acid Yellow 3 (Ref. No. 15985)), and a mixture of (n-ethyl-n-[4-[[4-[ethyl[(3-sulfophenyl)methyl]amino]-phenyl](2-sulfophenyl)-methylene)]2,5-cyclohexadien-1-ylidene]-3-sulfobenzenemethanaminium hydroxide inner salt, disodium salt and trisodium (4E)-5-oxo-1-(4-sulfonatophenyl)-4-[(4-sulfonatophenyl)hydrazono]-3-pyrazolecarboxylate (Aquashade®). Other suitable anti-photosynthetic dyes may be found in Tables I and II of U.S. Pat. No. 4,042,367 to Wilson, which is incorporated herein by reference.

A first medium (e.g., an aqueous nutrient composition) may be provided in and/or added to a bioreactor (e.g., a pond) and may be maintained at a desired set-point level (e.g., specific volume), according to some embodiments. A bioreactor system, in some embodiments, may be configured to collect rainfall and/or to intake water from a source of ground, surface, or recycled water (e.g., storm water, recycled water) or any other suitable water source. According to some embodiments, a bioreactor system may further comprise an additional storage container (e.g., container or pond) for excess growth medium.

In some embodiments, one or more smaller bioreactors (e.g., pond) may be designed and sized to adequately serve as "feeder" bioreactors to a larger bioreactor. Smaller bioreactors, in some embodiments, may be first inoculated and grown to high density at which point they may optimally seed a larger bioreactor in a manner that supports faster growth.

In some embodiments, a bioreactor system may comprise a monitoring system. A monitoring system may be configured to display and/or provide one or more user alerts regarding bioreactor condition(s) (e.g., nutrient concentrations, pH, dissolved oxygen levels, growth medium levels, microcrop distribution, flow rate, temperature) and/or adjust operating conditions (e.g., growth medium flow rate and/or timing and/or quantity of nutrient addition; "feeder" microcrop addition, oxygen or carbon dioxide addition), in some embodiments. Adjustments may be made continuously, semi-continuously, periodically, intermittently, as needed, at set or variable times, or any other interval. In some embodiments, adjustments may be selected to optimize growth rates and/or yield of the aquatic species. For example, a microcrop species may be grown in large-scale, open bioreactors with monitoring systems configured to adjust the introduction of materials (e.g., fresh or recycled water, fresh or recycled growth media) based on, for example, exposure to light, which may thereby regulate nutrient consumption rates.

A bioreactor system may comprise, in some embodiments, a single container in which the microcrop may be cultivated. In some embodiments, the bioreactor system may comprise multiple cultivation containers that may be connected, partially connected, or disconnected. A bioreactor (e.g., a pond), in some embodiments, may be an earthen basin with the embankments made of compacted dirt removed from the interior bottom of the bioreactor. According to some embodiments the bioreactor may be an artificial container (e.g., metal, plastic, resin). A bioreactor system may comprise an open bioreactor, a closed bioreactor, a semi-open bioreactor, or any combination thereof. In some embodiments, a bioreactor system may be configured to divide the container(s) into channels or cells. A bioreactor system may be configured to permit a flow of growth medium, in some embodiments. A bioreactor system, in some embodiments, may include a propulsion system (e.g., paddle wheels, bubbling, submerged or surface water jets, submerged mixers) and/or a recirculation system. In some embodiments, a bioreactor system may be configured to adjust the flow rate of a growth medium (e.g., to redistribute nutrient concentrations or microcrop growth patterns).

In some embodiments a bioreactor system may be open (e.g., in a horizontal plane relative to the ground) of a bioreactor container (e.g., serpentine raceway) such that a growth medium contained within the bioreactor container and/or a microcrop growing on a top surface of the growth medium may be exposed to a wind initiating from an exterior of the bioreactor container. A bioreactor system, according to some embodiments, may be partially open (e.g., in a horizontal plane relative to the ground) with at least 90% or at least 80%, or at least 70%, or at least 60%, or at least 50%, or at least 40%, or at least 30%, or at least 20%, or at least 10% of the top surface of the contained culture media being open. A top surface may be open, according to some embodiments, where the surface is substantially free (e.g., free) of any covering or other barrier, where the surface is directly exposed to ambient weather conditions, where there is substantially no membrane, glass, cover or other barrier (whether or not such barrier has pores or apertures) between the surface and the atmosphere, and/or where ambient atmosphere is the only occupant of the space immediately and directly above the surface for a distance of at least about 1 meter above the surface.

A bioreactor system, in some embodiments, may monitor and adjust a thickness and distribution of a microcrop mat. For example, when a microcrop reaches a specified thickness or distribution a bioreactor system may initiate harvest procedures. In some embodiments, a minimum thickness of a microcrop mat may be maintained such that a desired evapotranspiration rate of a growth medium within a bioreactor system may be maintained. A minimum thickness of a microcrop may be maintained, in some embodiments, such that less sunlight is capable of penetrating a surface of a growth medium (i.e., reducing a growth potential of submerged aquatic species such as algae).

A microcrop may be cultivated by any suitable method and is not limited to the method described herein. Various changes may be made in the method of cultivation of a microcrop without departing from the scope of the instant disclosure.

Harvesting of a Microcrop

Figure 3:
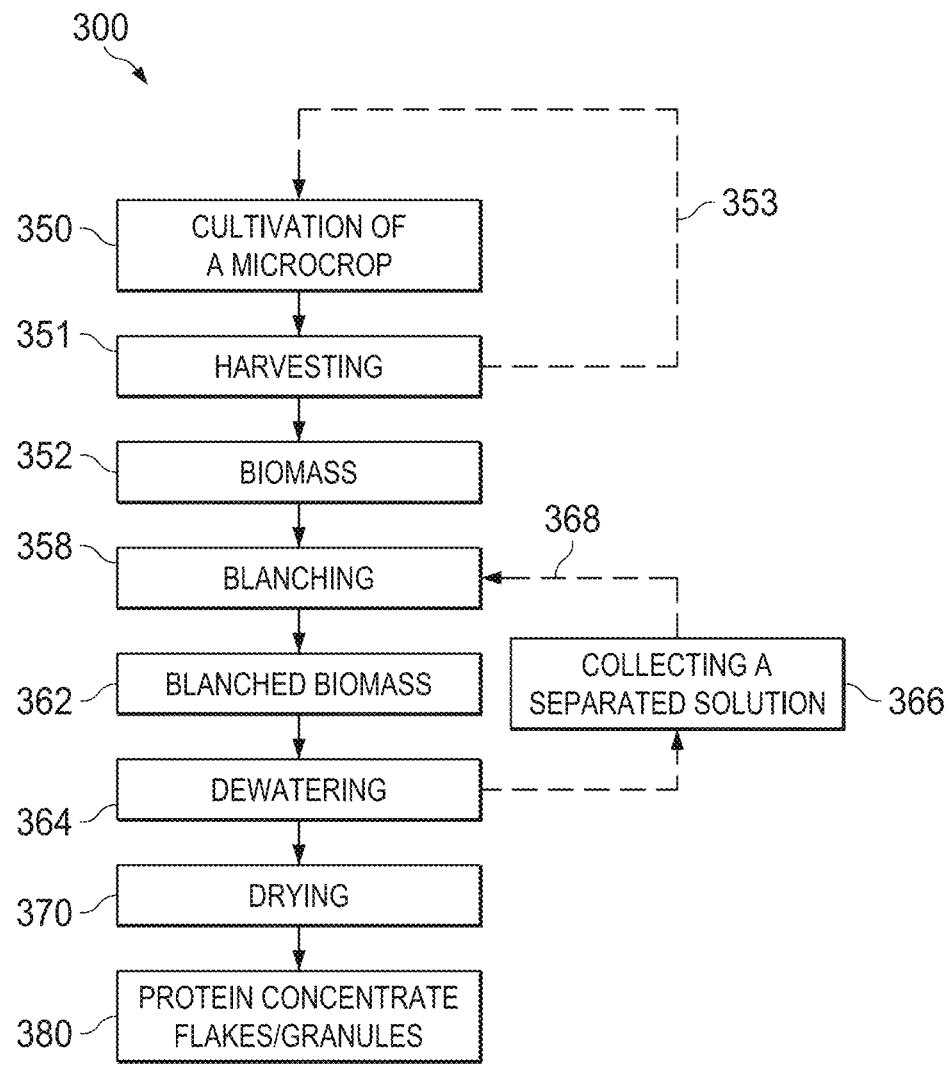
FIG. 3 is a flow diagram illustrating a process for cultivating, harvesting, and processing a microcrop for the production of high-concentration protein product according to a specific example embodiment of the disclosure.
Figure 4:
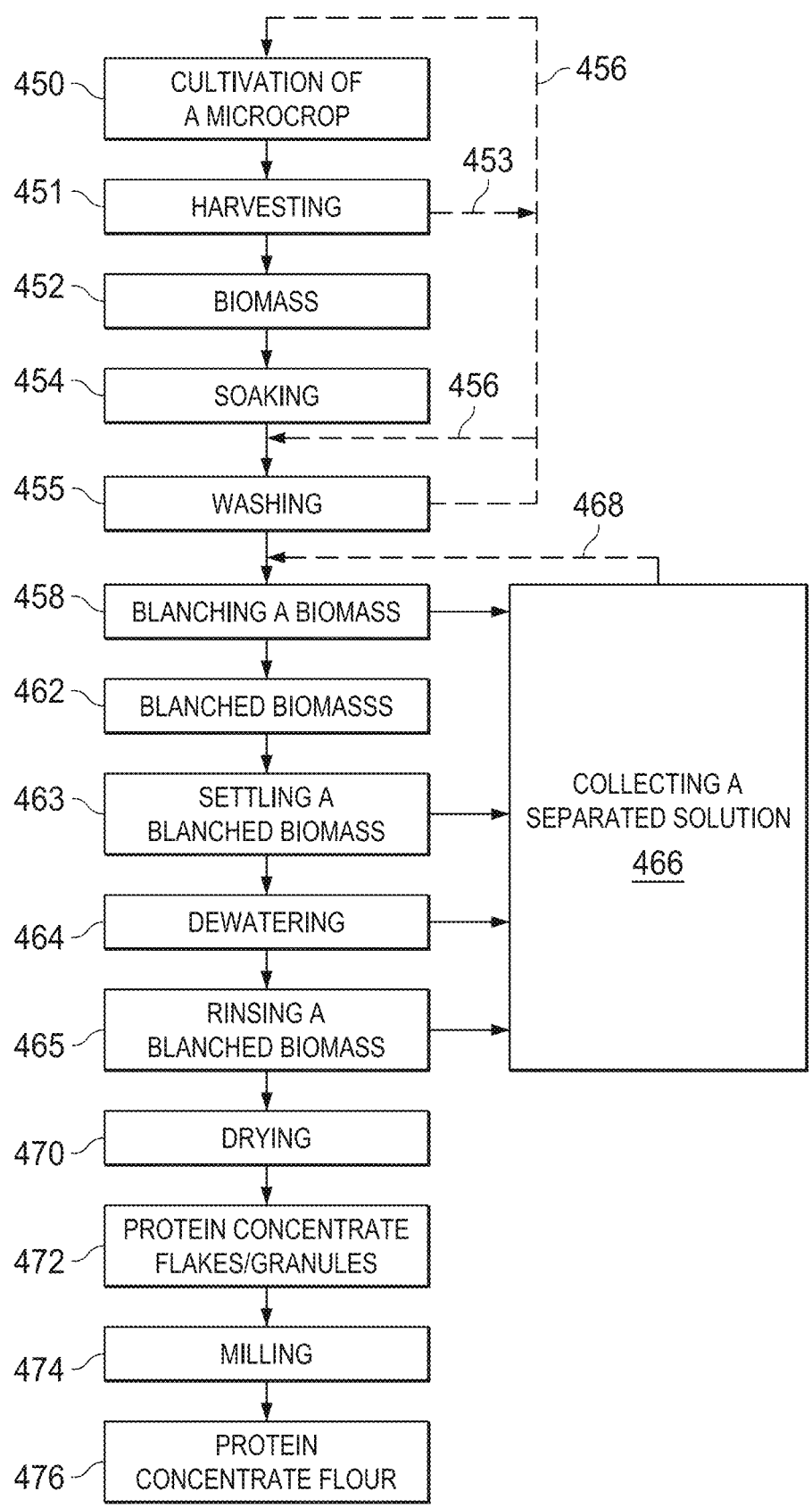
FIG. 4 is a flow diagram illustrating a process for cultivating, harvesting, and processing a microcrop for the production of high-concentration protein product according to a specific example embodiment of the disclosure.

As shown in FIGS. 3 and 4, a microcrop may be harvested 351/451 in whole or in part at any desired time(s) to form a biomass 352/452. For example, a microcrop may be harvested at one or more specific times, at regular or irregular intervals and/or continuously. Selection of harvest time(s) and/or intervals may be based on environmental conditions (e.g., precipitation, relative humidity, temperature range, average, low or high threshold and/or light intensity, wavelength range, duration of exposure) and/or the microcrop exhibiting one or more desired characteristics (e.g., mat thickness, mat distribution, maturation). Harvesting a microcrop may be manual or automated. In some embodiments, an automated skimmer system may collect a microcrop from a bioreactor system and transfer a harvested microcrop (e.g., via a pumping system) onto an inclined vibrating screen to separate a biomass from growth medium and debris. A microcrop, in some embodiments, may be harvested by vacuum skimming the microcrop from the bioreactor system through a stationary or mobile screen filter. According to some embodiments, a biomass slurry, including a harvested microcrop (e.g., *Lemna*) and a growth medium (e.g., water), may be conveyed to an inclined vibrating screen where a biomass (e.g., microcrop) may be separated from the growth medium.

As shown in FIGS. 3 and 4, during harvesting, a separated growth medium may be recycled 353/453 back into the bioreactor system or to an additional storage container (e.g., container or pond), according to some embodiments. In some embodiments, at least about 40%, or at least about 50%, or at least about 60%, or at least about 70%, or at least about 80%, or at least about 90%, or at least about 95% of a growth medium (e.g., water) separated from a biomass may be recycled for further use in cultivating, harvesting, and/or processing a microcrop. In some embodiments, recycling a separated growth medium may include filtering a separated growth medium by coarse filtration (e.g., gravity filtration, vibratory screen filtration), fine filtration (e.g., microfiltration, ultrafiltration, nanofiltration, reverse osmosis filtration), or any combination thereof.

Soaking and/or Buffering a pH of a Biomass

After harvesting, a biomass may be soaked (e.g., FIG. 4 454) and/or buffered. Soaking and/or buffering a harvested biomass may contribute to a reduction in an oxalic acid content of a protein product. In some embodiments, soaking and/or buffering a harvested biomass may contribute to a reduction in an oxalic acid and/or oxalate content of a protein product.

In some embodiments, a harvested biomass may be soaked in a second medium (e.g., FIG. 4 454). A second medium may comprise water (e.g., ground water, surface water, recycled water), distilled water, reverse osmosis or nanofiltered water, and/or a nutrient composition, according to some embodiments. In some embodiments, a second medium may comprise any desired portion of recycled fluid. For example, a second medium may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled fluid from another stage of the process.

According to some embodiments, a second medium may be configured to have a low nitrogen composition (e.g., a low nitrogen second medium). For example, a low nitrogen second medium may comprise a nitrogen concentration of ≤ about 20 parts per million (ppm), ≤ about 18 ppm, ≤ about 16 ppm, or ≤ about 14 ppm, or ≤ about 12 ppm, or ≤ about 10 ppm, or ≤ about 9 ppm, or ≤ about 8 ppm, or ≤ about 7 ppm, or ≤ about 6 ppm, or ≤ about 5 ppm, or ≤ about 4 ppm, or ≤ about 3 ppm, or ≤ about 2 ppm, or ≤ about 1 ppm, or ≤ about 0.5 ppm, or about 0 ppm. In some embodiments, a low nitrogen second medium may comprise a nitrogen concentration of about 0 ppm to about 20 ppm, or about 0.5 ppm to about 20 ppm, or about 0.5 ppm to about 15 ppm, or about 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. A low nitrogen second medium, according to some embodiments, may comprise a nitrogen concentration of at most about 10 ppm (e.g., ±1 ppm). In some embodiments, a low nitrogen second medium may comprise a nitrogen concentration of at most about 5 ppm (e.g., ±0.5 ppm). A low nitrogen second medium may comprise at least some quantity of nitrogen in contrast to, for example, a no nitrogen second medium having no detectable nitrogen (i.e., $N_2$). In some embodiments, a second medium may be a no nitrogen second medium.

According to some embodiments, a second medium may be configured to have a low calcium composition (e.g., a low calcium second medium). For example, a low calcium second medium may comprise a calcium concentration of ≤ about 20 ppm, ≤ about 18 ppm, ≤ about 16 ppm, or ≤ about 14 ppm, or ≤ about 12 ppm, or ≤ about 10 ppm, or ≤ about 9 ppm, or ≤ about 8 ppm, or ≤ about 7 ppm, or ≤ about 6 ppm, or ≤ about 5 ppm, or ≤ about 4 ppm, or ≤ about 3 ppm, or ≤ about 2 ppm, or ≤ about 1 ppm, or ≤ about 0.5 ppm, or about 0 ppm. In some embodiments, a low calcium second medium may comprise a calcium concentration of about 0 ppm to about 20 ppm, or about 0.5 ppm to about 20 ppm, or about 0.5 ppm to about 15 ppm, or about 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. A low calcium second medium, according to some embodiments, may comprise a calcium concentration of at most about 10 ppm (e.g., ±1 ppm). In some embodiments, a low calcium second medium may comprise a calcium concentration of at most about 5 ppm (e.g., ±0.5 ppm). In some embodiments, soaking a biomass in a low calcium second medium may effect the equilibrium between an oxalic acid concentration and an oxalate concentration (e.g., calcium oxalate).

In some embodiments, a second medium may be configured to have a high calcium composition (e.g., a high calcium second medium). For example, a high calcium second medium may comprise a calcium concentration of ≤ about 800 ppm, or ≤ about 750 ppm, or ≤ about 700 ppm, or ≤ about 650 ppm, or ≤ about 600 ppm, or ≤ about 550 ppm, or ≤ about 500 ppm, or ≤ about 450 ppm, or ≤ about 400 ppm, or ≤ about 350 ppm, or ≤ about 300 ppm, or ≤ about 250 ppm, or ≤ about 200 ppm, or ≤ about 150 ppm, or ≤ about 100 ppm, or ≤ about 50 ppm. In some embodiments, a high calcium second medium may comprise a calcium concentration of about 50 ppm to about 200 ppm, or about 50 ppm to about 400 ppm, or about 50 ppm to about 600 ppm, or about 100 ppm to about 800 ppm, or about 100 ppm to about 700 ppm, or about 100 ppm to about 600 ppm, or about 100 ppm to about 500 ppm, or about 300 ppm to about 600 ppm, or about 200 ppm to about 800 ppm. A high calcium second medium, according to some embodiments, may comprise a calcium concentration of at most about 800 ppm (e.g., ±50 ppm). In some embodiments, a high calcium second medium may comprise a calcium concentration of at most about 600 ppm (e.g., ±50 ppm). In some embodiments, soaking a biomass in a high calcium second medium may effect the equilibrium between an oxalic acid concentration and an oxalate concentration (e.g., calcium oxalate). For example, soaking a biomass in a high calcium second medium may convert oxalic acid into oxalate.

In some embodiments, a second medium may be configured to have a low calcium composition and a low nitrogen composition (e.g., a low nitrogen and calcium growth medium). For example, a low nitrogen and calcium growth medium may comprise a calcium concentration of ≤ about 20 ppm, or ≤ about 18 ppm, or ≤ about 16 ppm, or ≤ about 14 ppm, or ≤ about 12 ppm, or ≤ about 10 ppm, or ≤ about 9 ppm, or ≤ about 8 ppm, or ≤ about 7 ppm, or ≤ about 6 ppm, or ≤ about 5 ppm, or ≤ about 4 ppm, or ≤ about 3 ppm, or ≤ about 2 ppm, or ≤ about 1 ppm, or ≤ about 0.5 ppm, or about 0 ppm. A low nitrogen and calcium growth medium may comprise a nitrogen concentration of ≤ about 20 ppm, or ≤ about 18 ppm, or ≤ about 16 ppm, or ≤ about 14 ppm, or ≤ about 12 ppm, or ≤ about 10 ppm, or ≤ about 9 ppm, or ≤ about 8 ppm, or ≤ about 7 ppm, or ≤ about 6 ppm, or ≤ about 5 ppm, or ≤ about 4 ppm, or ≤ about 3 ppm, or ≤ about 2 ppm, or ≤ about 1 ppm, or ≤ about 0.5 ppm, or about 0 ppm. In some embodiments, a low nitrogen and calcium second medium may comprise a calcium concentration of about 0 ppm to about 20 ppm, or about 0.5 ppm to about 20 ppm, or 0.5 ppm to about 15 ppm, or 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. In some embodiments, a low nitrogen and calcium second medium may comprise a nitrogen concentration of about 0 ppm to about 20 ppm, or about 0.5 ppm to about 20 ppm, or 0.5 ppm to about 15 ppm, or 0.5 ppm to about 10 ppm, or about 1 ppm to about 9 ppm, or about 1 ppm to about 7 ppm, or about 1 ppm to about 6 ppm, or about 1 ppm to about 5 ppm, or about 3 ppm to about 6 ppm, or about 2 ppm to about 8 ppm. A low nitrogen and calcium second medium, according to some embodiments, may comprise a calcium concentration of at most about 10 ppm (e.g., ±1 ppm). In some embodiments, a low nitrogen and calcium second medium may comprise a calcium concentration of at most about 5 ppm (e.g., ±0.5 ppm). A low nitrogen and calcium second medium, according to some embodiments, may comprise a nitrogen concentration of at most about 10 ppm (e.g., ±1 ppm). In some embodiments, a low nitrogen and calcium second medium may comprise a nitrogen concentration of at most about 5 ppm (e.g., ±0.5 ppm). In some embodiments, soaking a biomass in a low nitrogen and low calcium second medium may effect the equilibrium between an oxalic acid concentration and an oxalate concentration (e.g., calcium oxalate).

Soaking a biomass (e.g., FIG. 4 454) may comprise submerging a biomass in a second medium to form a biomass slurry, according to some embodiments. In some embodiments, a biomass may be soaked for about 1 hour, or about 2 hours, or about 4 hours, or about 6 hours, or about 8 hours, or about 10 hours, or about 12 hours, or about 16 hours, or about 20 hours, or about 24 hours, or about 36 hours, or about 48 hours, or about 60 hours, or about 72 hours, or about 84 hours, or about 96 hours, or about 108 hours, or about 120 hours, or about 132 hours, or about 144 hours. Soaking a biomass may include agitation, flow, movement, spraying, or stirring of a second medium. According to some embodiments, a biomass slurry, including a soaked microcrop (e.g., *Lemna*) and a second medium (e.g., a low nitrogen second medium), may be conveyed to an inclined vibrating screen where a biomass (e.g., microcrop) may be separated from the second medium.

According to some embodiments a biomass may be buffered in a third medium, according to some embodiments. A third medium may comprise water (e.g., ground water, surface water, recycled water), distilled water, reverse osmosis water and/or nanofiltered water, according to some embodiments. In some embodiments, a third medium may comprise any desired portion of recycled fluid. For example, a third medium may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled fluid from another stage of the process (e.g., a reject stream from filtration).

Buffering a pH of a biomass may comprise submerging a biomass in a third medium to form a biomass slurry, according to some embodiments. In some embodiments, a biomass may be buffered for about 1 hour, or about 2 hours, or about 4 hours, or about 6 hours, or about 8 hours, or about 10 hours, or about 12 hours, or about 16 hours, or about 20 hours, or about 24 hours, or about 36 hours, or about 48 hours. According to some embodiments, a biomass slurry, including a buffered microcrop (e.g., *Lemna*) and a third medium (e.g., distilled water, ground water, surface water, rain water), may be conveyed to an inclined vibrating screen where a biomass (e.g., microcrop) may be separated from the third medium. In other embodiments, a biomass (e.g., microcrop) may be separated from the third medium by draining.

According to some embodiments, buffering a pH of a biomass may include changing (e.g., raise, lower) or maintaining a pH value of the biomass. In some embodiments, buffering a biomass may comprise changing (e.g., raising, lowering) or maintaining a pH value of a biomass to below about 8.0, or below about 7.5, or below about 7.0, or below about 6.5, or below about 6.0, or below about 5.5, or below about 5.0, or below about 4.5, or below about 4.0, or below about 3.5, or below about 3.0. According to some embodiments, buffering a biomass may comprise changing (e.g., raising, lowering) or maintaining a pH value of a biomass to a range of: from about 3.0 to about 7.5, or from about 3.5 to about 7.5, or from about 4.0 to about 7.5, or from about 4.5 to about 7.5, or from about 5.0 to about 7.5, or from about 5.5 to about 7.5, or from about 6.0 to about 7.5, or from about 6.5 to about 7.5. As would be appreciated by someone having ordinary skill in the art, buffering a biomass by adjusting a pH value of a biomass may promote protein stability which may, in some embodiments, promote greater protein yields in comparison to a non-buffered biomass.

One or more of a soaked biomass and a buffered biomass generated in one procedure may be stored in their respective container (e.g., soaking container, buffering container) before being fed to one or more downstream procedures or apparatuses. This may accommodate different operation schedules or modes including, for example, continuous mode, batch mode, or multiple feeding streams to one or more downstream procedure(s) and/or apparatus(es). For example, in some embodiments, a biomass may be harvested during daylight hours and processed (e.g., soaking and/or buffering), subsequently the processed biomass may be further processed (e.g., lysing, separating) in smaller batches (e.g., a first portion, a second portion) to accommodate the capacity limitations of the downstream processing machinery.

Washing a Biomass

As shown in FIG. 4, in some embodiments, processing a microcrop or biomass (e.g., first portion, second portion) may include a wash procedure 455 to remove excess growth medium, a solvent solution, debris, contaminants, microorganisms, and/or toxins. Washing a biomass may increase a purity and/or yield of a protein product. A wash procedure may disinfect and/or disinfest a biomass, reducing or removing bacteria, fungi, viruses, insects, and any combination thereof which are on or around the surfaces of the biomass. In some embodiments a wash procedure may be performed by exposing (e.g., submerging, spraying) at least one surface of a biomass to a wash solution (e.g., water, growth medium, antimicrobial solution). A wash solution, in some embodiments, may be combined with a biomass (e.g., first portion, second portion) to form a slurry.

In some embodiments, a wash solution may comprise any desired portion of recycled fluid. For example, a wash solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled wash solution, filtered blanching solution). In some embodiments a wash solution may be an aqueous solution or solvent. A wash solution may contain one or more antimicrobials, de-infestation compounds, fatty acids, alcohols, chlorine, oxidizing compounds, and any combination thereof (e.g., ozonated water).

According to some embodiments a wash solution may be applied at an elevated temperature and/or high pressure. A wash solution may remain in contact with a biomass for at least about 1 second, or for at least about 5 seconds, or for at least about 10 seconds, or for at least about 20 seconds, or for at least about 30 seconds, or for at least about 1 minute, or for at least about 5 minutes. In some embodiments, a second wash solution (e.g., water, ozonated water, a recycled wash solution, a filtered blanching solution may be applied to a biomass. A third wash solution (e.g., water, ozonated water, a recycled wash solution, a filtered blanching solution may be applied to a biomass, in some embodiments. A composition of a first wash solution, a second wash solution, and a third wash solution may be the same or different from one another. In some embodiments a first wash solution may be or may comprise a filtered blanching solution, a second wash solution may be water, and a third wash solution may be ozonated water. Some or all of a wash solution (e.g., a first, second, and/or third wash solution), in some embodiments, may be separated from a biomass (e.g., using an inclined screen or vibratory screen).

In some embodiments, some or all of a wash solution, second wash solution, and/or third wash solution may be collected and reused/recycled (e.g., a recycled wash solution), as shown in FIG. 4 456. At least about 40%, or at least about 50%, or at least about 60%, or at least about 70%, or at least about 80%, or at least about 90%, or at least about 95% of a wash solution, second wash solution, and/or third wash solution (e.g., water) separated from the biomass may be recycled for future use as a recycled wash solution and/or as growth medium in the bioreactor system, according to some embodiments.

A wash solution, second wash solution, and/or third wash solution, in some embodiments, may have or may be adjusted to have any desired pH. For example, the pH of a wash solution, second wash solution, and/or third wash solution may be neutral or basic (e.g., about 7.0, or about 7.5, or about 8.0, or about 8.5, or about 9.0, or about 9.5, or about 10.0). According to some embodiments, the pH of a wash solution, second wash solution, and/or third wash solution may be from about 7.0 to about 7.5, or from about 7.5 to about 8.0, or from about 8.0 to about 8.5, or from about 8.5 to about 9.0, or from about 9.0 to about 9.5, or from about 9.5 to about 10.0. The pH of a wash solution, second wash solution, and/or third wash solution may be from about 7.0 to about 10.0, or from about 7.0 to about 9.5, or from about 7.0 to about 9.0, or from about 7.0 to about 8.5, or from about 7.0 to about 8.0, or from about 7.0 to about 7.5, in some embodiments.

A wash solution (e.g., a first, second, and/or third wash solution) may have a temperature below room temperature (e.g., about 12° C.) at the time of use. Cooling a wash solution, and thereby the microcrop, may improve protein recovery efficiency and/or decrease proteolytic activity. In some embodiments, a wash solution (e.g., a first, second, and/or third wash solution) may have a temperature below about 30° C., or below about 20° C., or below about 15° C., or below about 10° C., or below about 5° C., or below about 2° C., or below about 1° C., or below about 0° C. at the time of use. A wash solution (e.g., a first, second, and/or third wash solution) may have a temperature between about 0° C. and about 10° C., or between about 5° C. and about 15° C., or between about 10° C. and about 20° C., or 15° C. and about 25° C., or between about 20° C. and about 30° C. at the time of use, in some embodiments.

Blanching a Biomass

Figure 3A:
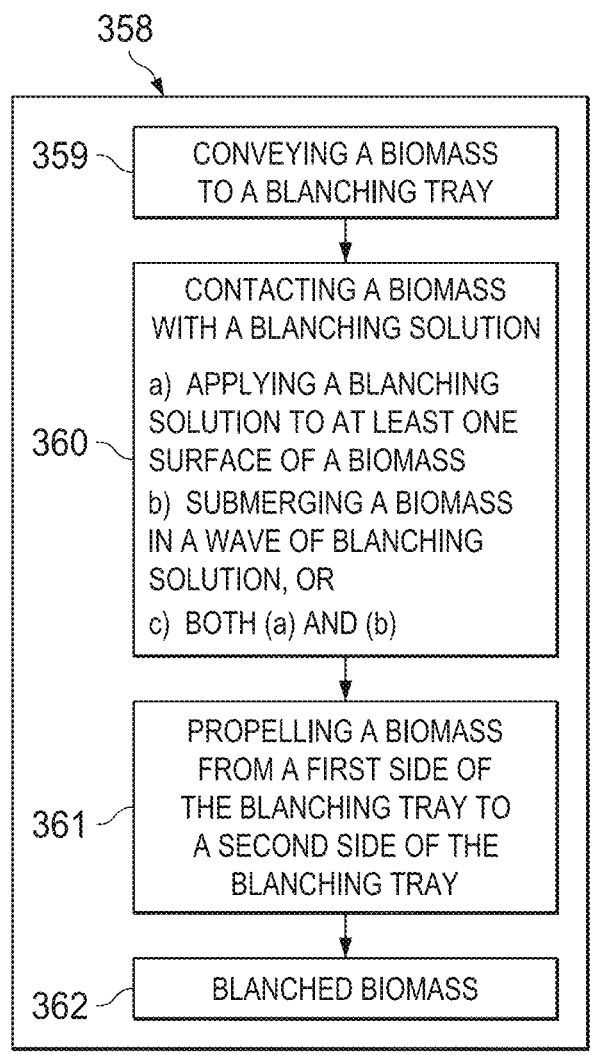
FIG. 3A is a flow diagram illustrating a process for blanching a microcrop for the production of high-concentration protein product according to a specific example embodiment of the disclosure.

As shown in FIGS. 3 and 4, in some embodiments, processing a microcrop or biomass (e.g., first portion, second portion) may include blanching a microcrop material 358/458 (e.g., a biomass) to form a blanched biomass 362/462. Blanching 358/458 may be performed, for example, on a biomass: (1) after harvesting (e.g., as shown in FIG. 3); or (2) after harvesting and washing, or (3) after harvesting and soaking, or (4) after harvesting, washing, and soaking (as shown in FIG. 4), in some embodiments. According to some embodiments, a blanching procedure may be used either instead of or in addition to a wash procedure. Blanching, according to some embodiments, may decrease an ash content, an oxalic acid content, and/or a phenol (e.g., tannin) content of a high-concentration protein product (e.g., wet, flake/granule, flour). As shown in FIG. 3A, according to some embodiments, blanching a biomass 358 (e.g., first portion, second portion) may include conveying a biomass to a blanching tray 359 and contacting the biomass with a blanching solution 360 to form a blanched biomass 362. In some embodiments, blanching a biomass may include directing (e.g., propelling) a biomass from a first side of a blanching tray to a second side of the blanching tray, where the first side is opposite the second side 361.

Conveying a Biomass to a Blanching Tray

Conveying a biomass to a blanching tray 359 may be performed using a conveyance mechanism. A conveyance mechanism, in some embodiments, may comprise a conveyor belt or series of conveyor belts. In some embodiments, a conveyance mechanism may include a slide or chute wherein a biomass enters a blanching tray at least in part due to gravitational forces. According to some embodiments, a biomass may be conveyed to a blanching tray 359 at a desired feed rate. A feed rate, in some embodiments, may be about 0.5 kg/min, or about 1 kg/min, or about 1.5 kg/min, or about 2 kg/min, or about 3 kg/min, or about 4 kg/min, or about 5 kg/min, or about 10 kg/min, or about 20 kg/min, or about 50 kg/min, or about 100 kg/min, or about 150 kg/min, or about 200 kg/min, or about 250 kg/min, or about 300 kg/min, or about 350 kg/min, or about 400 kg/min. In some embodiments, a feed rate may be regulated to maintain a desired product flow rate ratio (e.g., 7:1).

According to some embodiments, a blanching tray may be oriented to receive a volume of blanching solution from an applicator (e.g., FIG. 1 114) (e.g., a shower). A blanching tray may be capable of containing a biomass (e.g., first portion, second portion) and/or a volume of blanching solution. A blanching tray may have any dimensions and composition suitable for its operability. According to some embodiments, a blanching tray may be square or rectangular in shape (e.g., when viewed from above). In some embodiments, a blanching tray may have a first side (e.g., FIG. 1 118) opposite a second side (e.g., FIG. 1 119) and a third side opposite a fourth, where the first side, third side, and fourth side each have a first height and the second side has a second height which is less than the first height. For example, in some embodiments, a second side may be a weir operable to maintain a desired volume of a blanching solution in a blanching tray. According to some embodiments, a top edge of a second side may include one or more notches. A blanching tray, in some embodiments, may have a depth of about 0.5 cm, or about 1 cm, or about 2 cm, or about 3 cm, or about 4 cm, or about 5 cm, or about 6 cm, or about 8 cm, or about 10 cm, where "about" may be, for example, plus or minus 1 cm. According to some embodiments, a second side of a blanching tray may have a height about 0.5 cm less than a height of a first side of the blanching tray, or about 1 cm less, or about 2 cm less, or about 3 cm less, or about 4 cm less, or about 5 cm less than a height of a first side, a third side, and a fourth side of the blanching tray, where "about" may be, for example, plus or minus 0.5 cm.

Contacting a Biomass with a Blanching Solution

As shown in FIG. 3A, according to some embodiments, blanching a biomass 358 (e.g., first portion, second portion) may include contacting the biomass with a blanching solution 360 to form a blanched biomass 362. In some embodiments, contacting a biomass with a blanching solution 360 may include: (a) applying a blanching solution to at least one surface of a biomass (e.g., showering), (b) submerging (e.g., completely, partially) a biomass in a wave of blanching solution, or (c) a combination of (a) and (b).

According to some embodiments, a blanching solution may include water, ground water, well water, distilled water, reverse osmosis water, nano-filtered water, or any combination thereof. In some embodiments, a blanching solution may further include at least one dissolved solid (e.g., ash). A blanching solution may further comprise at least one calcium salt (e.g., calcium chloride, calcium acetate), according to some embodiments. Blanching a biomass with a blanching solution comprising at least one calcium salt (e.g., calcium chloride, calcium acetate) may remove at least some soluble oxalic acid from a biomass by conversion to insoluble calcium oxalate. In some embodiments, a calcium salt may be selected from calcium chloride, calcium acetate, calcium carbonate, calcium hydroxide, or a combination thereof. A blanching solution, in some embodiments, may include, at least in part, a blanching solution which was exposed to a microcrop, collected, and re-used (e.g., a recycled blanching solution FIG. 3 369).

A blanching solution, in some embodiments, may have a temperature at the time it contacts a biomass of more than about 60° C., or more than about 65° C., or more than about 70° C., or more than about 75° C., or more than about 80° C., or more than about 85° C., or more than about 90° C., or more than about 95° C., or more than about 100° C.

Applying a Blanching Solution to at Least One Surface of a Biomass

According to some embodiments, contacting a biomass with a blanching solution 360 may include applying a blanching solution to at least one surface of the biomass (e.g., showering). In some embodiments, applying a blanching solution may involve using an applicator to direct a volume of blanching solution onto at least one surface of a biomass. An applicator (e.g. FIG. 1 114) may be any element or combination of elements that is capable of applying a blanching solution to at least one surface of the biomass (e.g., showering). For example, in some embodiments, an applicator (e.g., FIG. 1 114) may be a shower. In some embodiments, an applicator may apply a blanching solution to at least one surface of a biomass by cascading, showering, spraying, misting, fogging, pouring, or dripping or otherwise dispensing a blanching solution, or any combination thereof.

According to some embodiments, a blanching solution may be applied to at least one surface of a biomass in a selected droplet size and/or volume. For example, in some embodiments, a blanching solution may be applied to at least one surface of a biomass in a droplet size of about 5 µL, or about 10 µL, or about 20 µL, or about 30 µL, or about 40 µL, or about 50 µL, or about 100 µL, or about 200 µL. In some embodiments, a blanching solution may be applied to at least one surface of a biomass at a rate of about 0.5 L/min, or about 1 L/min, or about 2 L/min, or about 3 L/min, or about 4 L/min, or about 5 L/min, or about 6 L/min, or about 7 L/min, or about 8 L/min, or about 10 L/min, or at least about 25 L/min, or at least about 50 L/min, or at least about 100 L/min, or at least about 200 L/min, or at least about 300 L/min, or at least about 500 L/min, or at least about 750 L/min, or at least about 1000 L/min, or at least about 1500 L/min, or at least about 2000 L/min, or at least about 2250 L/min, or at least about 2500 L/min, in some embodiments.

Submerging a Biomass in a Wave of Blanching Solution

According to some embodiments, contacting a biomass with a blanching solution 360 may include submerging a biomass (e.g., completely, partially) in a wave of blanching solution within a blanching tray. A wave may include any disturbance on a top surface of the volume of blanching solution, such as a wave action, a ridge, a swell, or a ripple (hereinafter "a wave") that may be capable of depositing any quantity of blanching solution onto a top surface (i.e., a surface facing away from a bottom surface of blanching tray 117/217) of a biomass.

A blanching tray (e.g., FIG. 1 117) may be operable to contain a biomass (e.g., first portion, second portion) and/or a volume of blanching solution. A blanching tray may have any dimensions and composition suitable for its operability. According to some embodiments, a blanching tray may be square or rectangular in shape (e.g., when viewed from above). In some embodiments, a blanching tray (e.g., FIG. 1 117) may have a first side (e.g., FIG. 1 118) opposite a second side (e.g., FIG. 1 119) and a third side opposite a fourth, where the first side, third side, and fourth side each have a first height and the second side has a second height which is less than the first height. For example, in some embodiments, a second side may be a weir operable to maintain a desired volume of a blanching solution in a blanching tray. According to some embodiments, a top edge of a second side may include one or more notches. A blanching tray, in some embodiments, may have a depth of about 0.5 cm, or about 1 cm, or about 2 cm, or about 3 cm, or about 4 cm, or about 5 cm, or about 6 cm, or about 8 cm, or about 10 cm, where "about" may be, for example, plus or minus 1 cm. According to some embodiments, a second side of a blanching tray may have a height about 0.5 cm less than a height of a first side of the blanching tray, or about 1 cm less, or about 2 cm less, or about 3 cm less, or about 4 cm less, or about 5 cm less, where "about" may be, for example, plus or minus 1 cm. According to some embodiments, a blanching tray (e.g., FIG. 1 117) may be oriented to receive a volume of blanching solution exiting an applicator (e.g., FIG. 1 114 (e.g., a shower).

In some embodiments, a wave of blanching solution within a blanching tray may be generated by a vibrating blanching tray mechanism comprising a blanching tray and a vibratory mechanism (e.g., FIGS. 1 and 2). According to some embodiments, a vibratory mechanism (e.g., FIG. 1 120) may be capable of vibrating a blanching tray (e.g., FIG. 1 117) to generate a net motion (e.g., a wave) of a volume of blanching solution within the blanching tray. In some embodiments, vibratory mechanism (e.g., FIG. 1 120) may be directly connected to or incorporated into a design of blanching tray (e.g., FIG. 1 117). In other embodiments, a vibratory mechanism may be adjacent to a blanching tray. For example, as shown in FIG. 2, a vibratory mechanism 220 may include a platform suspended on a system of springs 221 such that a blanching tray 217 may be attached (e.g., fixedly, removably) to the platform and thereby exposed to vibrational forces (e.g., oscillation) generated. A vibratory mechanism, in some embodiments, may be installed directly on a platform being vibrated or indirectly coupled to the platform being vibrated. In some embodiments, a vibratory mechanism may comprise one or more one-axis motors, one or more stepper motors, one or more servo motors, one or more axis motor drives, one or more weights (e.g., balanced, unbalanced), or any combination thereof.

In some embodiments, a wave of blanching solution within a blanching tray may be generated by a vibratory mechanism (e.g., FIG. 1 120) producing a net motion of the volume of blanching solution. A wave may be capable of depositing any quantity of blanching solution onto a top surface (i.e., a surface facing away from a bottom surface of blanching tray 117/217) of a biomass. A wave of a volume of blanching solution may result in a biomass being submerged (e.g., completely, partially). Submerging a biomass in a wave of blanching solution may include a top surface (i.e., a surface facing away from a bottom surface of blanching tray) of a biomass being covered by a quantity of blanching solution 106/206 (e.g., repeatedly covered, partially covered). For example, submerging a biomass in a wave of blanching solution may include a top surface of a biomass being repeatedly exposed to a volume of blanching solution as one or more waves (i.e., a disturbance of the blanching solution (e.g., one or more waves) roll across a blanching tray. Submerging a biomass in a wave of blanching solution may result in more uniform blanching of the biomass.

In some embodiments, contacting a biomass with a blanching solution 360 may include both (a) applying a blanching solution to at least one surface of a biomass (e.g., showering) and (b) submerging (e.g., completely, partially) a biomass in a wave of blanching solution.

Directing a Biomass Across a Blanching Tray

According to some embodiments, contacting a biomass with a blanching solution 360 may include directing (e.g., propelling) a biomass from a first side (e.g., FIG. 1 118) of a blanching tray (e.g., FIG. 1 117) to a second side (e.g., FIG. 1 119) of the blanching tray, where the first side is opposite the second side. In some embodiments, a net motion of a volume of blanching solution generated by a vibratory mechanism (e.g., FIG. 1 120) may generate a motive force capable of directing (e.g., propelling) biomass from a first side of blanching tray to a second side of blanching tray, where the first side is opposite the second side. In some embodiments, a second side of a blanching tray may have a height less than a height of a first side of the blanching tray (e.g., a weir); thereby allowing a volume of blanching solution and/or a mass of biomass to exit the blanching tray after it is transported from the first side (e.g., FIG. 1 118) to the second side (e.g., FIG. 1 119) of the blanching tray. According to some embodiments, a mass of biomass and/or a volume of blanching solution may exit a blanching tray after being propelled from a first side of blanching tray to a second side of blanching tray.

In some embodiments, directing (e.g., propelling) a biomass from a first side of a blanching tray to a second side of the blanching tray, where the first side is opposite the second side, may involve using gravity, paddle wheels, bubbling, submerged or surface water jets, submerged mixers, a vibratory mechanism, or any combination thereof as a propulsion mechanism.

Blanching Conditions and Flow Rate

According to some embodiments, a biomass may be contacted with a blanching solution (e.g., FIG. 3A 360) for up to about 20 seconds (sec), or up to about 30 sec, or up to about 40 sec, or up to about 50 sec, or up to about 1 min, or up to about 1 min 15 sec, or up to about 1 min 30 sec, or up to about 1 min 45 sec, or up to about 2 min, or up to about 2 min 30 sec or up to about 3 min, or up to about 4 min, or up to about 5 min, or up to about 6 min, or up to about 7 min, or up to about 8 min, or up to about 9 min, or up to about 10 min, according to some embodiments. In some embodiments, a biomass may be contacted with a blanching solution (e.g., FIG. 3A 360) for about 20 sec to about 40 sec, or about 30 sec to about 45 sec, or about 30 sec to about 1 min, or about 30 sec to about 1 min 30 sec, or about 30 sec to about 2 min, or about 30 sec to about 5 min, or about 1 min to about 5 min, or about 1 min to about 5 min, or about 1 min to about 10 min, or about 30 sec to about 10 min, where "about" may be, for example, plus or minus 10%.

In some embodiments, a biomass may be contacted with a blanching solution having a temperature of about 85° C. for about 40 sec.

A blanching solution, in some embodiments, may change temperature while contacting a biomass. For example, according to some embodiments, a biomass may be contacted by a blanching solution having an initial temperature of between about 92° C. and about 94° C. where the contact continues for a period of about 40 sec at which point the blanching solution may have a final contact temperature of between about 75° C. and about 77° C. In some embodiments, a blanching solution, in some embodiments, may have an initial temperature (e.g., a temperature at a time where the blanching solution first contacts a biomass) of more than about 60° C., or more than about 65° C., or more than about 70° C., or more than about 75° C., or more than about 80° C., or more than about 85° C., or more than about 90° C., or more than about 95° C., or more than about 100° C. A blanching solution, in some embodiments, may have a final contact temperature (e.g., a temperature at a time where the biomass exits the blanching tray) of less than about 60° C., or less than about 65° C., or less than about 70° C., or less than about 75° C., or less than about 80° C., or less than about 85° C., or less than about 90° C., or less than about 95° C., or less than about 100° C.

In some embodiments, blanching a biomass 358 may be performed at a product flow rate ratio calculated by dividing a pump rate by a feed rate. For example, in some embodiments, a blanching solution may be propelled at a pump rate of 28 liters per min (L/min) and biomass may be conveyed at a feed rate of 4 kg per min (kg/min) resulting in a product flow rate ratio of 7:1. According to some embodiments, blanching a biomass 358 may have a product flow rate ratio of about 10:1, or about 9:1, or about 8:1, or about 7.5:1, or about 7:1, or about 6.5:1, or about 6:1, or about 5.5:1, or about 5:1, or about 4.5:1, or about 4:1, or about 3.5:1, or about 3:1, or about 2.5:1, or about 2:1, or about 1.5:1, or about 1:1, according to some embodiments.

Monitoring a Blanching Process

According to some embodiments, blanching a biomass may include monitoring one or more of the following: a volume of blanching solution within a blanching tray (e.g., FIG. 1 117); a mass of a biomass within a blanching tray; a volume of a blanching solution exiting a blanching tray; a mass of a biomass exiting a blanching tray; a temperature of a blanching solution within a blanching tray (e.g., average temperature, at specific locations); a temperature of a blanching solution exiting a blanching tray; a rate of net motion; a height and frequency of wave action; a dissolved solids content (e.g., ash) of a blanching solution. In some embodiments, blanching a biomass may include adjusting one or more of the following conditions in response to monitored conditions: a rate of blanching solution exiting an applicator (e.g., FIG. 1 114), a temperature of a blanching solution applied onto a biomass, a rate of net motion, a dilution rate (i.e., rate of diluting a separated solution), or any combination thereof. In some embodiments, monitoring a blanching process may include a monitoring device (e.g., a first gauge 122/222) communicating with a central control system or one or more components of a blanching apparatus (e.g., FIG. 1 100) to maintain or adjust a desired product flow rate ratio (e.g., 7:1) or a dilution rate (e.g., 2.5:1).

Settling A Blanched Biomass

As shown in FIG. 4, according to some embodiments, a method may include settling a blanched biomass 463. In some embodiments, settling a blanched biomass 463 may occur in a settling tank (e.g., FIG. 2 224). According to some embodiments, after being propelled from a first side of blanching tray to a second side of blanching tray, where the first side is opposite the second side, a blanched biomass and/or a volume of blanching solution may exit a blanching tray and enter a settling tank (e.g., FIG. 2 224). A settling tank, in some embodiments, may be, directly or indirectly, connected to blanching tray in such a way that a blanched biomass and a volume of blanching solution may flow into settling tank (e.g., gravity flow, propulsion).

Settling a blanched biomass 464 may allow contaminants and/or debris to become dislodged from a blanched biomass thereby generating a purer product. In some embodiments, settling a blanched biomass may involve gravitational removal of non-buoyant solids. Non-buoyant solids, in some embodiments, may include fresh water arthropods or molluscs (e.g., gammarus and snails).

A settling tank (e.g., FIG. 2 224) may have any dimensions and/or composition suitable for its operability. According to some embodiments, a settling tank (e.g., FIG. 2 224) may be square or rectangular in shape. In some embodiments, a settling tank may have a first side (e.g., FIG. 2 225) opposite a second side (e.g., FIG. 2 226) and a third side opposite a fourth, where the first side, third side, and fourth side each have a first height and the second side has a second height which is less than the first height. For example, in some embodiments, a second side may be a weir operable to maintain a desired volume of a blanching solution in a blanching tray. According to some embodiments, a top edge of a second side may include one or more notches. A settling tank (e.g., FIG. 2 224), in some embodiments, may have a depth of about 5 cm, or about 7.5 cm, or about 10 cm, or about 12.5 cm, or about 15 cm, or about 17.5 cm, or about 20 cm, or about 22.5 cm, or about 25 cm, or about 30 cm, or about 35 cm, or about 40 cm, or about 45 cm, or about 50 cm, where "about" may represent plus or minus 2.5 cm. In some embodiments, a settling tank (e.g., FIG. 2 224) may include one or more sloping sides and/or a sloping bottom which may aid in removal of contaminants, debris, or non-buoyant solids that sink below a surface of a settling solution.

In some embodiments, settling a blanched biomass (e.g., FIG. 4 463) may include exposing at least one surface of a blanched biomass to a settling solution. A settling solution may include any liquid having characteristics which permit contaminants and/or debris to sink away from a top surface of the settling solution. According to some embodiments, a settling solution may comprise a blanching solution. A settling solution, in some embodiments, may comprise water, ground water, well water, distilled water, deionized water, reverse osmosis water, nanofiltered water, ultra-filtered water, or any combination thereof. In some embodiments, a settling solution may be selected to have a specific viscosity.

Settling a blanched biomass 463, in some embodiments, may include filtering one or more non-buoyant solids from a settling tank. In some embodiments, a settling tank (e.g., FIG. 2 224) may include filters or screens that may aid in filtering a biomass from debris, contaminants, and/or non-buoyant solids. For example, in some embodiments, a settling tank may include a screen across a surface of the settling tank but below a top surface of a settling solution. A screen, in some embodiments, may include a mesh size small enough to retain a biomass but large enough to allow at least some debris, contaminants, and/or non-buoyant solids to pass through. In some embodiments, a screen may be capable of vibratory motion such that a blanched biomass may be transported from a first side 225 of a settling tank to a second side 226 of the settling tank, where the first side and the second side are opposite.

According to some embodiments, settling a blanched biomass (e.g., FIG. 4 463) may include debris, contaminants, and/or non-buoyant solids settling to a bottom of a settling tank. Debris, contaminant, and/or non-buoyant solids may be recycled (e.g., used in a microcrop cultivation system, fish food), in some embodiments.

According to some embodiments, settling a blanched biomass (e.g., FIG. 4 463) may include cooling a blanched biomass. For example, a settling solution within settling tank (e.g., FIG. 2 224) may have a temperature less than a temperature of a blanching solution (e.g., FIG. 2 206) (e.g., below about 60° C.) thus when at least one surface of a blanched biomass is exposed to the settling solution the blanched biomass cools. In some embodiments, a settling solution may have a temperature below about 90° C., or below about 80° C., or below about 70° C., or below about 60° C., or below about 50° C., or below about 40° C., or below about 30° C., or below about 20° C. at the time of use. A settling solution, in some embodiments, may have a temperature between about 20° C. and about 80° C., or between about 40° C. and about 80° C., or between about 40° C. and about 60° C., or between about 20° C. and about 40° C., or between about 20° C. and about 30° C. at the time of use.

In some embodiments, settling a blanched biomass (e.g., FIG. 4 463) may include monitoring a settling tank (e.g., using a second gauge FIG. 2 229). In some embodiments, monitoring a settling tank may measuring one or more of the following: a volume of a settling solution within settling tank; a mass of a blanched biomass within a settling tank; a volume of a settling solution exiting a settling tank; a mass of a blanched biomass exiting a settling tank; a temperature of a settling solution within a settling tank (e.g., average temperature, at specific locations); a temperature of a settling solution exiting a settling tank; a dissolved solids content (e.g., ash) of a settling solution. In some embodiments, monitoring a settling tank (e.g., using a second gauge FIG. 2 229) may include a monitoring mechanism (e.g., a second gauge FIG. 2 229) communicating with a central control system and/or one ore more elements of a blanching apparatus (e.g., FIG. 2 200). For example, a monitoring mechanism (e.g., a second gauge FIG. 2 229) may communicate with (e.g., directly, through a central control system) a heating element (e.g., FIG. 2 212), an applicator (e.g., FIG. 2 214), a vibratory mechanism (e.g., FIG. 2 220), a tank (e.g., FIG. 2 236), a pump and valve system (e.g., FIG. 2 248), or any combination thereof such that various conditions may be adjusted. According to some embodiments, settling a blanched biomass (e.g., FIG. 4 463) may include a monitoring mechanism (e.g., a second gauge FIG. 2 229) communicating with a central control system and/or one ore more elements of a blanching apparatus (e.g., FIG. 2 200) to maintain or adjust a desired product flow rate ratio (e.g., 7:1) or a dilution rate (e.g., 2:1).

In some embodiments, settling a blanched biomass (e.g., FIG. 4 463) may include propulsion of a blanched biomass (e.g., first portion, second portion) from a first side of a settling tank (e.g., FIG. 2 225) to a second side of the settling tank (e.g., FIG. 2 226), where the first side and the second side are opposite one another. In some embodiments, propulsion of a blanched biomass may include use of a propulsion mechanism of a settling tank. For example, a propulsion mechanism of a settling tank may include gravity, paddle wheels, bubbling, submerged or surface water jets, submerged mixers, a vibratory mechanism, or any combination thereof, according to some embodiments. In some embodiments, a propulsion mechanism may include a pump operable to pump a settling solution from an entry point to an exit point of settling tank.

According to some embodiments, directing (e.g., propelling) a biomass from a first side of settling tank to a second side of settling tank may result in a mass of biomass and/or a volume of settling solution exiting the settling tank and entering a dewatering mechanism (e.g., FIG. 2 234). A dewatering mechanism may be, directly or indirectly, connected to a blanching tray or a settling tank in such a way that a mass of biomass, a volume of blanching solution, and/or a volume of settling solution may flow into the dewatering mechanism (e.g., gravity flow, propulsion), in some embodiments.

Dewatering a Blanched Biomass

As shown in FIGS. 3 and 4, a method 300/400 may include dewatering a blanched biomass 364/464. Dewatering a blanched biomass may occur after (1) blanching a biomass (e.g., FIG. 3) or (2) after blanching a biomass and settling a blanched biomass, (e.g., FIG. 4), according to some embodiments.

Dewatering a blanched biomass, in some embodiments, may include separating a blanching solution, a settling solution, or any combination (individually and collectively "a separated solution") (e.g., FIGS. 1 and 2 135/235) from a blanched biomass. In some embodiments, dewatering a blanched biomass may involve using a dewatering mechanism, including, for example, gravity separation, draining, an inclined screen, a vibratory screen, filtration, a decanter centrifuge, a belt press, a fan press, a rotary press, a screw press, a filter press, a finisher press, or any combination thereof.

According to some embodiments, after being propelled from a first side of a settling tank to a second side of settling tank, where the first side is opposite the second side, a mass of blanched biomass and/or a volume of settling solution may exit the settling tank and enter a dewatering mechanism. In some embodiments, after being propelled from a first side of a blanching tray to a second side of blanching tray, where the first side is opposite the second side, a mass of blanched biomass and/or a volume of a blanching solution may exit the blanching tray and enter a dewatering mechanism. In some embodiments, a method may include depositing a blanched biomass into a dewatering mechanism without traveling from a first side to a second side of a blanching tray, a settling tank, or a rinsing mechanism. For example, in some embodiments, a blanching tray containing a biomass and a blanching solution may be directly emptied (e.g., chute feed, gravity feed) into a dewatering mechanism without departing from the scope of the instant disclosure.

Rinsing a Blanched Biomass

According to some embodiments, a method may include rinsing (e.g., FIG. 4 465) a blanched biomass. In some embodiments, rinsing (e.g., FIG. 4 465) a blanched biomass may remove unwanted dissolved solids from a blanched biomass.

According to some embodiments, rinsing a blanched biomass may include exposing at least one surface of the blanched biomass to a rinsing solution. According to some embodiments, exposing at least one surface of a blanched biomass to a rinsing solution may involve depositing a rinsing solution through a sprinkler head onto at least one surface of a biomass, where the biomass is located on a vibratory screen, and operating the vibratory screen to remove at least some of the rinsing solution. Exposing at least one surface of a blanched biomass to a rinsing solution may include floating or submerging a blanched biomass in a rinsing tank (e.g., FIG. 2 230), according to some embodiments. A rinsing tank may have any suitable dimensions or shape. In some embodiments, a rinsing tank may have a depth of about 5 cm, or about 7.5 cm, or about 10 cm, or about 12.5 cm, or about 15 cm, or about 17.5 cm, or about 20 cm, or about 22.5 cm, or about 25 cm, or about 30 cm, or about 35 cm, or about 40 cm, or about 45 cm, or about 50 cm, where "about" may represent plus or minus 1 cm.

According to some embodiments, a rinsing solution may include water, distilled water, reverse osmosis water, nanofiltered water, a blanching solution, a settling solution, a recycled blanching solution, a recycled settling solution, a recycled rinsing liquid, or any combination thereof. According to some embodiments, a rinsing solution may be sterilized (e.g., UV radiation, filtration, heating). In some embodiments, a dilution solution (e.g., FIG. 2 208) may be used as a rinsing solution.

In some embodiments, rinsing (e.g., FIG. 4 465) a blanched biomass may lower a temperature of the blanched biomass. For example, rinsing a blanched biomass may include exposing at least one surface of a blanched biomass to a rinsing solution having a temperature below a temperature of the blanched biomass. In some embodiments, a rinsing solution may have a temperature below room temperature (e.g., about 12° C.) at the time of use. In some embodiments, a rinsing solution may have a temperature below about 50° C., or below about 40° C., or below about 30° C., or below about 20° C., or below about 15° C., or below about 10° C., or below about 5° C., or below about 2° C., or below about 1° C., or below about 0° C. at the time of use. A rinsing solution may have a temperature between about 0° C. and about 10° C., or between about 5° C. and about 15° C., or between about 10° C. and about 20° C., or 15° C. and about 25° C., or between about 20° C. and about 30° C., or between about 0° C. and about 50° C. at the time of use, in some embodiments.

In some embodiments, rinsing a blanched biomass may include directing (e.g., propelling) a blanched biomass from a first side of a rinsing mechanism (e.g., vibratory screen, rinsing tank) to a second side of the rinsing mechanism, where the first side and the second side are opposite one another. According to some embodiments directing (e.g., propelling) a blanched biomass may include using gravity, paddle wheels, bubbling, submerged or surface water jets, submerged mixers, a vibratory mechanism, or any combination thereof.

According to some embodiments, rinsing a blanched biomass may further include dewatering a rinsed blanched biomass to remove excess liquid. Dewatering a rinsed blanched biomass may be performed using a dewatering mechanism, including, for example, gravity separation, draining, an inclined screen, a vibratory screen, filtration, a decanter centrifuge, a belt press, a fan press, a rotary press, a screw press, a filter press, a finisher press, or any combination thereof.

Collecting a Separated Solution

As shown in FIGS. 3 and 4, in some embodiments, a method may include collecting 366/466 a separated solution (e.g., FIG. 2 235). A separated solution, in some embodiments, may include a blanching solution, or a settling solution, or a rinsing solution, or any combination thereof. Collecting a separated solution 466 may involve storing (e.g., transiently, extended) the separated solutions in a collection tank, in some embodiments. A collection tank (e.g., FIG. 2 236) may have any size, shape, dimensions, or composition suitable for collecting and retaining liquid. In some embodiments, a collection tank may be the same as a source (e.g., FIG. 1 110) (i.e., a single container serves as both a source and a collection tank). A separated solution within a collection tank may be stationary or moving (e.g., agitation, propulsion).

According to some embodiments, collecting 366/466 a separated solution may include monitoring a separated solution. According to some embodiments, monitoring a separated solution may include monitoring a composition (e.g., total dissolved solids) and/or temperature of a separated solution. Monitoring a composition of a separated solution may include monitoring one or more of the following: total dissolved solids, total solids, turbidity, electrical conductivity, nutrient (e.g., nitrogen) composition, salinity, pH, in some embodiments.

In some embodiments, collecting 366/466 a separated solution may include maintaining or adjusting a composition (e.g., total solids, turbidity) of a separated solution. In some embodiments, a method may include communicating with (e.g., through a collection tank gauge FIG. 2 238) with one or more components of a blanching apparatus (e.g., a pump and valve system, a dilution tank), either directly or through a central control system (e.g., FIG. 2 202), to regulate a composition of a separated solution (e.g., by adjusting a dilution rate). In some embodiments, a method may include communicating with (e.g., through a collection tank gauge FIG. 2 238) one or more components of a blanching apparatus (e.g., a pump and valve system, a dilution tank), either directly or through a central control system (e.g., FIG. 2 202), to maintain and/or adjust a desired product flow rate ratio (e.g., 7:1).

Maintaining or adjusting a composition of a separated solution, in some embodiments, may include maintaining or adjusting a total solids content of a volume of separated solution and/or a volume of a blanching solution in a collection tank at/to a value of less than 0.5%, or less than 1% (w/w) or less than 2% (w/w), or less than 4% (w/w), or less than 6% (w/w) or less than 8% (w/w), or less than 10% (w/w). According to some embodiments, maintaining or adjusting a composition of a separated solution may include maintaining or adjusting a turbidity value (e.g., relative to absorbance of a 500 nm light source where 1.0 is equivalent to 10% absorbance and 10.0 is equivalent to 100% absorbance) of a volume of separated solution 135/235 and/or a volume of a blanching solution 106/206 at a value of less than about 0.5, or less than about 0.75, or less than about 1.0, or less than about 1.25, or less than about 1.5, where about may represent plus or minus 5%. In some embodiments, maintaining or adjusting a composition of a separated solution may include maintaining or adjusting an electrical conductivity value of the separated solution at/to a value of less than about 2000 μS/cm, or less than about 2500 μS/cm, or less than about 3000 μS/cm, or less than about 3500 μS/cm, or less than about 4000 μS/cm, or less than about 4500 μS/cm, or less than about 5000 μS/cm, or less than about 5500 μS/cm, or less than about 6000 μS/cm, where "about" may represent plus or minus 250 μS/cm.

In some embodiments, maintaining or adjusting a composition of a separated solution may include diluting a separated solution. Dilution of a separated solution (e.g., FIG. 1 135) may be desirable to adjust a composition of the separated solution (e.g., dissolved solids content, turbidity). A diluted separated solution may be recycled as a blanching solution (e.g., FIG. 4 368), as a wash solution, as a settling solution, as a rinsing solution, or any combination thereof, in some embodiments. In some embodiments, diluting a separated solution may involve discarding a volume of discard solution (e.g., FIG. 2 243) from a collection tank and imputing a volume (e.g., an equal volume) of a dilution solution (e.g., FIG. 2 208). A discard solution may have a volume equal to a volume of dilution solution necessary to achieve a desired composition of dissolved solids (e.g., ash), according to some embodiments. In some embodiments, a discard solution may have a volume higher than a volume of dilution solution necessary to achieve a desired composition of dissolved solids (e.g., ash). A rate of discarding a volume of separated solution from a collection tank may be regulated by a collection tank gauge (e.g., total tank volume), in some embodiments.

In some embodiments, a discard solution (e.g., FIG. 1 143) may be recycled as a growth medium in the cultivation of a microcrop. According to some embodiments, a dilution solution may be stored in a dilution source. A dilution solution (e.g., FIG. 1 108), according to some embodiments, may include water, ground water, well water, distilled water, deionized water, reverse osmosis water, nanofiltered water, ultra-filtered water, or any combination thereof. A dilution source (e.g., FIG. 1 142), in some embodiments, may include a holding tank, a well, a water line, or any other container or system capable of holding a liquid. In some embodiments, diluting a separated solution may include discarding a volume of separated solution (i.e., a discard solution 143/243) from a collection tank.

According to some embodiments, a separated solution (e.g., FIG. 1 135) and/or a blanching solution (e.g., FIG. 1 106) in a collection tank (e.g., FIG. 1 136) may be diluted to comprise a desired composition of dissolved solids (e.g., ash) and/or total solids. In some embodiments, a volume of separated solution and/or a volume of a blanching solution in a collection tank may be diluted to have a total solids content at a value of less than 0.5% (w/w), or less than 1% (w/w) or less than 2% (w/w), or less than 4% (w/w), or less than 6% (w/w) or less than 8% (w/w), or less than 10% (w/w). According to some embodiments, a separated solution in collection tank may be diluted to have a turbidity value (e.g., relative to absorbance of a 500 nm light source where 1.0 is equivalent to 10% absorbance and 10.0 is equivalent to 100% absorbance) of a volume of separated solution 135/235 and/or a volume of a blanching solution 106/206 at a value of less than about 0.5, or less than about 0.75, or less than about 1.0, or less than about 1.25, or less than about 1.5, where about may represent plus or minus 5%. In some embodiments, a separated solution and/or a blanching solution in a collection tank may be diluted to have an electrical conductivity value of less than about 2000 $\mu$S/cm, or less than about 2500 $\mu$S/cm, or less than about 3000 $\mu$S/cm, or less than about 3500 $\mu$S/cm, or less than about 4000 $\mu$S/cm, or less than about 4500 $\mu$S/cm, or less than about 5000 $\mu$S/cm, or less than about 5500 $\mu$S/cm, or less than about 6000 $\mu$S/cm, where "about" may represent, for example, plus or minus 250 $\mu$S/cm.

In some embodiments, a separated solution in collection tank may be diluted relative to a biomass feed rate. According to some embodiments, a separated solution in collection tank may be diluted relative to a feed to dilution ratio of about 4:1, or about 3.5:1, or about 3:1, or about 2.5:1, or about 2:1, or about 1.5:1, or about 1:1.

Diluting a separated solution may include subjecting a donor stream and a recipient stream to a heat exchanger. According to some embodiments, a heat exchanger (e.g., FIG. 1 144) (e.g., thermal energy exchange mechanisms) may decrease an overall energy input required for production of high-concentration protein product (e.g., protein flake) from a microcrop (e.g., *Lemna*). According to some embodiments, a heat exchanger may include a flow system wherein a stream of discard solution (e.g., FIG. 1 143) from collection tank (e.g., FIG. 1 136) (i.e., a donor stream) and a dilution solution stream (e.g., FIG. 1 108) (i.e., recipient stream) are adjacent such that thermal energy exchange may occur. In some embodiments, a dilution solution stream (i.e., a recipient stream) may have a cooler temperature and thereby a lower thermal energy than a donor stream (e.g., a discard solution stream which retains heat from a blanching solution). According to some embodiments, a heat exchanger may include a flow system (e.g., a series of pipes composed of conductive material) such that a dilution solution stream (i.e., a recipient stream) may absorb at least some thermal energy from a discard solution stream (i.e., a donor stream). In some embodiments, a heat exchanger may result in increasing a temperature of a dilution solution stream and/or a diluted separated solution in tank. In some embodiments, a heat exchanger may reduce an amount of energy required for heating a recycled solution in heating element (e.g., FIG. 1 112).

According to some embodiments, collecting a separated solution may include filtering a separated solution. Filtering a separated solution may include coarse filtration (e.g., gravity filtration, vibratory screen filtration), fine filtration (e.g., microfiltration, ultrafiltration, nanofiltration, reverse osmosis filtration), or any combination thereof. A filtered separated solution may be recycled as a wash solution, as a growth medium in the cultivation of a microcrop, as a blanching solution, as a settling solution, as a rinsing solution, or any combination thereof. In some embodiments, a blanching waste (e.g., retentate from a filtration method) may be recycled as part of a growth medium (e.g., as a nutrient source) in a cultivation of a microcrop.

A collected separated solution (e.g., diluted, filtered, monitored, subject to heat exchange, or any combination thereof) may be recycled as a wash solution, as a growth medium in the cultivation of a microcrop, as a blanching solution, as a settling solution, as a rinsing solution, or any combination thereof.

Reducing a Moisture Content of a Blanched Biomass

In some embodiments a method may further include reducing a moisture content of a blanched biomass. According to some embodiments, a moisture content of a blanched biomass may be reduced without cooling the blanched biomass. Reducing a moisture content of a blanched biomass may reduce capital and operational expenditures, for example, by reducing the energy needed to dry an end protein product (e.g., protein concentrate flake/granule).

In some embodiments an evaporation process may be used to reduce a moisture content of a blanched biomass. Evaporation may be performed by, for example, a thermal (evaporative) means such as: a rising film evaporator, a falling film evaporator, a natural circulation evaporator (vertical or horizontal), an agitated-film evaporator, a multiple-effect evaporator, by vacuum evaporation, or any combination thereof. Heat may be supplied directly into the evaporator, or indirectly through a heat jacket. Heat may either come from a raw source (e.g., combustion of natural gas, steam from a boiler) or from a waste heat stream (e.g., dryer exhaust) or from heat transferred by cooling the input stream.

According to some embodiments, a moisture content of a blanched biomass may be reduced using gravity separation, draining, an inclined screen, a vibratory screen, filtration, a decanter centrifuge, a belt press, a fan press, a rotary press, a screw press, a filter press, a finisher press, or any combination thereof.

In some embodiments an antioxidant (e.g., rosemary extract, Duralox®, Phyt-O-Blend CA) may be mixed with a blanched biomass prior to drying to improve shelf life of product (e.g., shelf life of a packaged product).

Solvent Extraction of a Blanched Biomass

According to some embodiments, a method of blanching a biomass to generate a high-concentration protein product may include a solvent extraction procedure to generate a solvent washed protein product.

A solvent washed protein product, in some embodiments, may have increased protein purity when compared to a protein product that was not subjected to a solvent extraction procedure. A solvent extraction procedure may decolor a blanched biomass, according to some embodiments, resulting in a solvent washed protein product having a reduced chlorophyll content (e.g., visually perceivable reduction in green coloration) compared to unwashed counterparts. In some embodiments, a solvent extraction procedure may reduce a fat content of a protein concentrate (e.g., wet, flake/granule, flour). The reduction of a fat content may increase the shelf-life of a high-concentration protein product.

Solvent extraction of a blanched biomass, in some embodiments, may comprise exposing (e.g., submerging, spraying, dripping) at least one surface of the blanched biomass to a solvent solution (e.g., ethanol, methanol, acetone). A solvent solution, in some embodiments, may be combined with a blanched biomass (e.g., first portion, second portion) to form a slurry. According to some embodiments, a solvent extraction procedure may include exposing (e.g., submerging, spraying, dripping, slurry) at least one surface of a blanched biomass to a solvent solution for at least about 5 sec., at least about 15 sec., at least about 30 sec., at least about 45 sec., at least about 1 min., at least about 2 min, at least about 3 min, at least about 5 min., at least about 10 min, at least about 20 min, at least about 30 min., at least about 40 min., at least about 50 min, at least about 1 hour, at least about 2 hours, at least about 3 hours, at least about 4 hours, at least about 5 hours, at least about 6 hours, at least about 12 hours, or at least about 24 hours. A solvent extraction procedure, in some embodiments, may include moving (e.g., agitating, stirring, propelling) at least a portion of a solvent solution at a specified time, intermittently, or continually.

In some embodiments a solvent solution may include one or more alcohols (e.g., ethanol, methanol, propanol, isopropanol, glycerol), acetone, dichloromethane, ethyl acetate, hexane, ketones, or combinations thereof. A solvent solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) of one or more alcohols (e.g., ethanol, methanol, propanol, isopropanol, glycerol), acetone, dichloromethane, ethyl acetate, hexane, ketones, or combinations thereof.

In some embodiments, a solvent may be recovered and recycled. Furthermore, according to some embodiments, a chlorophyll byproduct and/or a fat byproduct extracted from a blanched biomass by solvent extraction may be recovered from the solvent.

A solvent washed protein product, in some embodiments, may have a reduced fat content (e.g., about 2% of a protein concentrate flake/granule or less by weight) and/or a reduced chlorophyll content (e.g., visually perceivable reduction in green coloration) compared to unwashed counterparts. In some embodiments, a solvent washed protein product may appear colorless, white, substantially white, or have reduced green coloration. A solvent washed protein product, in some embodiments, may exhibit improved taste, color, shelf life (e.g., reduced oxidation of fats), protein density, malleability, and combinations thereof.

In some embodiments, a solvent washed protein product may have a fat content comprising lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by weight of a dry protein concentrate (e.g., flake, granule, flour). According to some embodiments, a solvent washed protein product may have a fat content comprising from about 1% to about 10%, or from about 10% to about 20%, or from about 20% to about 30%, or from about 30% to about 40%, or from about 40% to about 50% by weight of the a dry protein concentrate (e.g., flake, granule, flour).

In some embodiments, a solvent washed protein product may have a fat content comprising a percentage of a dry protein concentrate (e.g., flake, granule, flour) by weight of less than about 15% (w/w), less than about 10% (w/w), or less than about 6% (w/w), or less than about 4% (w/w), or less than about 2% (w/w), or less than about 1%, or less than about 0.5%, or less than about 0.2%, or less than about 0.1%. In some embodiments, a solvent washed protein product may have a fat content comprising from about 0.1% to about 0.2% by weight of a dry protein concentrate.

Drying a Protein Product

As shown in FIGS. 3 and 4, a process may include drying 370/470 a blanched biomass or a solvent washed protein product to generate a protein concentrate flake or a protein concentrate granule 472 (e.g., first portion, second portion), according to some embodiments. A drying procedure, in some embodiments, may reduce a moisture content of a blanched biomass or a solvent washed protein product to a desired level (e.g., lower moisture content, a desired moisture content). A moisture content of a protein concentrate flake/granule may be, for example, below about 90%, or below about 80%, or below about 70%, or below about 60%, or below about 50%, or below about 40%, or below about 30%, or below about 20%, or below about 10%, or below about 5%, or below about 1% by weight of the protein concentrate flake/granule, in some embodiments. A drying procedure may be performed using a mechanism including, for example, a spray dryer, a drum dryer, a double drum dryer, flash dryer, a fluid-bed dryer, a convection dryer, an evaporator, or any combination thereof.

In some embodiments, an inlet temperature of a dryer mechanism (the temperature at the entrance to a dryer) may be above 25° C., or above 50° C., or above 75° C., or above 100° C., or above 125° C., or above 150° C., or above 175° C., or above 200° C., or above 225° C., or above 250° C., or above 275° C., or above 300° C., or above 325° C., or above 350° C., or above 375° C., or above 400° C., or above 425° C., or above 450° C., or above 475° C., or above 500° C. An inlet temperature, in some embodiments, may be from about 25° C. to about 50° C., or from about 50° C. to about 75° C., or from about 75° C. to about 100° C., or from about 100° C. to about 125° C., or from about 125° C. to about 150° C., or from about 150° C. to about 175° C., or from about 175° C. to about 200° C., or from about 200° C. to about 225° C., or from about 225° C. to about 250° C., or from about 250° C. to about 275° C., or from about 275° C. to about 300° C., or from about 300° C. to about 325° C., or from about 325° C. to about 350° C., or from about 350° C. to about 375° C., or from about 375° C. to about 400° C., or from about 400° C. to about 425° C., or from about 425° C. to about 450° C., or from about 450° C. to about 475° C., or from about 475° C. to about 500° C., or above 500° C. An inlet temperature may be from about 50° C. to about 100° C., or from about 100° C. to about 150° C., or from about 150° C. to about 200° C., or from about 200° C. to about 250° C., or from about 250° C. to about 300° C., or from about 300° C. to about 350° C., or from about 350° C. to about 400° C., or from about 400° C. to about 450° C., or from about 450°

C. to about 500° C., or above 500° C., in some embodiments. According to some embodiments, an inlet temperature of a dryer mechanism may be about 225° C.

According to some embodiments, an outlet temperature of a dryer mechanism (the temperature at the exit from a dryer) may be below about 300° C., or below about 275° C., or below about 250° C., or below about 225° C., or below about 200° C., or below about 175° C., or below about 150° C., or below about 125° C., or below about 100° C., or below about 75° C., or below about 50° C., or below about 25° C. An outlet temperature may be from about 300° C. to about 275° C., or from about 275° C. to about 250° C., or from about 250° C. to about 225° C., or from about 225° C. to about 200° C., or from about 200° C. to about 175° C., or from about 175° C. to about 150° C., or from about 150° C. to about 125° C., or from about 125° C. to about 100° C., or from about 100° C. to about 75° C., or from about 75° C. to about 50° C., or from about 50° C. to about 25° C., or below about 25° C., in some embodiments. An outlet temperature, in some embodiments, may be from about 300° C. to about 250° C., or from about 250° C. to about 200° C., or from about 200° C. to about 150° C., or from about 150° C. to about 100° C., from about 100° C. to about 50° C., or from about 50° C. to about 25° C., or below about 25° C. According to some embodiments, an outlet temperature of a dryer mechanism may be about 75° C.

In some embodiments, a volume of a blanched biomass or a volume of a solvent washed protein product may be mixed with a volume of a protein concentrate flake/granule prior to drying. This process, known as back-mixing, may be employed when, for example, the moisture content of a blanched biomass exceeds the level that a dryer mechanism is capable of accepting. By back-mixing a protein concentrate flake/granule with a blanched biomass or a solvent washed protein product, a total moisture content may be kept within the specifications of a dryer mechanism, thereby reducing operational costs (e.g., wear and tear on equipment).

Milling

As shown in FIG. 4, according to some embodiments, a protein concentrate flake/granule may be milled 474 to form a protein concentrate flour 476. A milling procedure may involve a hammer mill, a pin mill, a knife mill, a vibrating mill, a fluid energy mill, a jet mill, or any combination thereof. A protein concentrate flour 476, in some embodiments, may have a particle size of less than 350 µm, or less than 300 µm, or less than 250 µm, or less than 200 µm, or less than 150 µm, or less than 100 µm, or less than 90 µm, or less than 80 µm, or less than 70 µm, or less than 60 µm, or less than 50 µm, or less than 40 µm, or less than 30 µm, or less than 20 µm, or less than 10 µm.

An antioxidant (e.g., rosemary extract, Duralox®, Phyt-O-Blend CA) may be mixed with a protein concentrate flake/granule or a protein concentrate flour before packaging, according to some embodiments.

According to some embodiments, a blanched biomass, or a partially dried (e.g., having a reduced moisture content) blanched biomass, or a solvent washed protein concentrate may be frozen, flash-frozen, or freeze dried.

In some embodiments, a blanched biomass or a solvent washed protein concentrate may be milled prior to drying (e.g., a dry milled protein concentrate).

A Continuous Blanching Process

The present disclosure further relates to a method of continuously blanching a biomass to generate a high-concentrate protein product (e.g., a protein concentrate flake/granule, a protein concentrate flour). In some embodiments, a method of continuously blanching a biomass may include: (a) blanching a first portion of the biomass with a blanching solution, (b) dewatering the first portion of the biomass to generate a blanched biomass and a separated solution, (c) collecting the separated solution, (d) blanching a second portion of the biomass with the separated solution, (e) dewatering the second portion of the biomass, (f) drying at least one of the first portion and the second portion of the biomass to generate at least one of a protein concentrate flake and a protein concentrate granule. In some embodiments, a protein concentrate flake and/or a protein concentrate granule may be milled to for a protein concentrate flour.

Protein Concentrate

Some embodiments relate to a process for production of a high-concentration protein product (e.g., a solvent washed protein concentrate, a protein concentrate flake/granule, a protein concentrate flour, a dry milled protein concentrate) from a biomass of a harvested microcrop (e.g., aquatic plant species, *Lemna*, algal species). A process may be configured or performed to achieve any desired protein yield (e.g., maximal yield, a selected yield). In some embodiments, a high-concentration protein product may have a protein concentration of at least about 35%, or at least about 40%, or at least about 45%, or at least about 50%, or at least about 60%, or at least about 65%, or at least about 70%, or at least about 75%, or at least about 80%, in each case, by dry mass basis (DMB). A remainder of a high-concentration protein product may include carbohydrates, fiber, fats, minerals, or any combination thereof. A high-concentration protein product protein concentrate may be suitable for animal feed and/or human consumption. For example, a high-concentration protein product may serve as an effective replacement for protein concentrates (e.g., soy, pea) which are presently used in a large number of human food products either individually or as ingredients and additives. According to some embodiments, at least of portion of a protein composition of a high-concentration protein product may comprise denatured or partially-denatured protein.

Protein Digestibility Corrected Amino Acid Score (PD-CAAS) and Digestibility

According to some embodiments, a high-concentration protein product may have a PDCAAS relative to a reference standard (e.g., casein) of at least 0.88, or at least 0.89, or at least 0.90, or at least 0.91, or at least 0.92, or at least 0.93, or at least 0.94, or at least 0.95. In some embodiments, a high-concentration protein product may have a PDCAAS of between 0.88 and 0.94, or between 0.90 and 0.94, or between 0.92 and 0.94. PDCAAS may be evaluated, for example, by an animal (e.g., rat) model or by an in vitro enzyme digestion model. Calculating a PDCAAS value may be dependent upon a limiting amino acid. According to some embodiments, a PDCAAS value of a high-concentration protein product may be limited by a histidine composition.

In some embodiments, a high-concentration protein product may have a digestibility of at least 88%, or at least 90%, or at least 92%, or at least 94%, or at least 95%, or at least 96%, or at least 97%, or at least 98% in each case. Digestibility may be determined, for example, using a rat model (casein digestibility) or an in vitro digestibility method (e.g., Animal-Safe Accurate Protein Quality Score (ASAP-Quality Score) method, TIM model, dynamic gastric model (DGM)).

Amino Acid Composition

In some embodiments, a high-concentration protein product may comprise one or more essential amino acids. For example, a high-concentration protein product may include one or more amino acids selected from leucine, isoleucine, lysine, methionine, phenylalanine, threonine, tryptophan, valine, histidine, arginine, aspartic acid, serine, glutamic acid, proline, glycine, alanine, tyrosine and cysteine. The concentration of an essential amino acid may be at least about 1 g/100 g of protein concentrate, or at least about 1.5 g/100 g of protein concentrate, or at least about 2 g/100 g of protein concentrate, or at least about 2.5 g/100 g of protein concentrate, or at least about 3 g/100 g of protein concentrate, or at least about 4 g/100 g of dry at least about 2.5 g/100 g of protein concentrate, or at least about 3 g/100 g of protein concentrate, or at least about 4 g/100 g of protein concentrate, or at least about 5 g/100 g of protein concentrate, or at least about 6 g/100 g of protein concentrate, or at least about 7 g/100 g of protein concentrate, or at least about 8 g/100 g of protein concentrate, or at least about 9 g/100 g of protein concentrate, or at least about 10 g/100 g of protein concentrate in some embodiments.

The concentration of an amino acid (e.g., an essential amino acid), in some embodiments, may be expressed as a weight fraction of the protein recovered from a high-concentration protein product, and is at least about 1 g/100 g of protein, or at least about 1.5 g/100 g of protein, or at least about 2 g/100 g of protein, or at least about 2.5 g/100 g of protein, or at least about 3 g/100 g of protein, or at least about 4 g/100 g of protein, or at least about 5 g/100 g of protein, or at least about 6 g/100 g of protein, or at least about 7 g/100 g of protein, or at least about 8 g/100 g of protein, or at least about 9 g/100 g of protein, or at least about 10 g/100 g of protein.

For example, a high-concentration protein product produced by the processes described herein may include the amino acid contents summarized in Table 2 below.

TABLE 2

Amino Acid Profiles of High Concentration Protein Products (g/100 g protein)

| Amino Acid | Product 1 | Product 2 |
| --- | --- | --- |
| Tryptophan | 2.1 | 2.1 + 10% |
| Alanine | 4.8 | 4.8 + 10% |
| Arginine | 5.7 | 5.7 + 10% |
| Aspartic Acid | 7.8 | 7.8 + 10% |
| Glutamic Acid | 9.4 | 9.4 + 10% |
| Glycine | 4.1 | 4.1 + 10% |
| Histidine | 2.0 | 2.0 + 10% |
| Isoleucine | 4.4 | 4.4 + 10% |
| Leucine | 7.7 | 7.7 + 10% |
| Phenylalanine + Tyrosine | 8.8 | 8.8 + 10% |
| Proline | 3.9 | 3.9 + 10% |
| Serine | 3.4 | 3.4 + 10% |
| Threonine | 3.7 | 3.7 + 10% |
| Lysine | 6.0 | 6.0 + 10% |
| Valine | 5.3 | 5.3 + 10% |
| Cysteine + Methionine | 2.9 | 2.9 + 10% |

Fat Content

In some embodiments, a high-concentration protein product may have a fat content lower than about 20%, or lower than about 15%, or lower than about 10%, or lower than about 8%, or lower than about 5%, or lower than about 4%, or lower than about 3%, or lower than about 2%, or lower than about 1%, or lower than 0.5%, or lower than 0.4%, or lower than 0.3%, or lower than 0.2%, or lower than 0.1% by DMB of the protein product. A high-concentration protein product may have a fat content from about 1% to about 10%, or from about 10% to about 20%, or from about 0.1% to about 10%, or from about 0.1% to about 5%, or from about 0.1% to about 2%, or from about 0.1% to about 1%, or from about 0.1% to about 0.5% by DMB of the high-concentration protein product in some embodiments. A protein concentrate may be further processed to meet a desired fat content (e.g., higher or lower concentration, a desired fat composition).

Chlorophyll Content

According to some embodiments, a high-concentration protein product may have a reduced chlorophyll content. In some embodiments, a high-concentration protein product may appear colorless or have reduced green coloration. A high-concentration protein product may have a chlorophyll content of less than 6,000 mg/100 g, or less than 5,500 mg/100 g, or less than 5,000 mg/100 g, or less than 4,500 mg/100 g, or less than 4,000 mg/100 g, or less than 3,500 mg/100 g, or less than 3,000 mg/100 g.

Apiogalacturonan and/or Oligogalacturan Content

In some embodiments, a high-concentration protein product may include at least one apiogalacturonan and/or oligogalacturonide. According to some embodiments, a high-concentration protein product polysaccharide product may have a concentration of at least one apiogalacturonan of at least 1% DMB, or at least 3% DMB, or at least 5% DMB, or at least 7% DMB, or at least 10% DMB, or at least 12% DMB, or at least 15% DMB, or at least 20% DMB, or at least 25% DMB, or at least 30% DMB. A high-concentration protein product, in some embodiments, may have a concentration of at least one apiogalacturonan of at least 10% DMB. In some embodiments, a polysaccharide product may have a concentration of at least one apiogalacturonan of at least 15% DMB. Concentrations recited in this paragraph may refer to a single apiogalacturonan or to the combined (total) concentration of two or more (up to all) apiogalacturonans present, according to some embodiments.

According to some embodiments, a concentration of at least one apiogalacturonan and/or oligogalacturonide in a high-concentration protein product may be determined by a phenol-sulfuric acid method, such as that described in Dubois, M., Gilles, K. A., Hamilton, J. K., et al., *Anal. Chem.*, 1956, vol. 28, no. 2, 350-356. A concentration of at least one apiogalacturonan and/or oligogalacturonide in a high-concentration protein product may be determined using UV spectrophotometry, such as that described in Albalasmeh, A., Berhe, A., and Ghezzeher, T., *Carbohydrate Polymers*, 2013, vol. 97, no. 2, 253-261, in some embodiments. Any desired method may be used to determine a concentration of at least one apiogalacturonan and/or oligogalacturonide in a high-concentration protein product.

A monosaccharide composition of a concentration of a high-concentration protein product may be determined by high pressure anion exchange chromatography (HPAEC), according to some embodiments. For example, HPAEC may be performed using a Dionex CarboPac PA1 column with amperometric detection of polysaccharide hydrolysis where hydrolysis was performed under the following conditions: (1) hydrolysis with 2N Trifluoroacetic acid (TFA) at 100° C. for 0.5 hours; (2) hydrolysis with 2N TFA at 100° C. for 4 hours; (3) hydrolysis with 2N $H_2SO_4$ at 100° C. for 6 hours; (4) hydrolysis with 2N $H_2SO_4$ at 100° C. for 6 hours after overnight exposure to 26N $H_2SO_4$ at room temperature.

In some embodiments, a monosaccharide composition of a high-concentration protein product may be determined by gas phase chromatography. For example, the relative composition of a monosaccharide of a high-concentration protein product may be identified and quantified by (1) hydrolyzing the product to form monosaccharides by methaolysis; (2) trimethylsilying the monosaccharides to form volatilized monosaccharides; and (3) quantifying and identifying the volatilized monosaccharides as O-methylglycosides by gas phase chromatography.

Oxalic Acid Content

According to some embodiments, a high-concentration protein product may have a reduced oxalic acid ($H_2C_2O_4$ or HOOCCOOH) content. In some embodiments, a high-concentration protein product may have an oxalic acid content of lower than about 1.5%, or lower than about 1.4%, or lower than about 1.3%, or lower than about 1.2%, or lower than about 1.1%, or lower than about 1.0%, or lower than about 0.9%, or lower than about 0.8%, or lower than about 0.75%, or lower than about 0.7%, or lower than about 0.65%, or lower than about 0.6%, lower than about 0.55%, lower than about 0.5%, or lower than about 0.45%, or lower than about 0.4%, or lower than about 0.35%, or lower than about 0.3%, or lower than about 0.25%, or lower than about 0.2%, or lower than about 0.15%, or lower than about 0.1%, or lower than about 0.05%, or lower than about 0.04%, or lower than about 0.03%, or lower 0.02% by DMB. A high-concentration protein product, in some embodiments may have an oxalic acid content of from about 0.02% to about 0.6%, from about 0.02% to about 0.5%, or from about 0.02% to about 0.4%, or from about 0.02% to about 0.3%, or from about 0.02% to about 0.2%, or from about 0.02% to about 0.15%, or from about 0.02% to about 0.1% by DMB. In some embodiments, a high-concentration protein product may have an oxalic acid content of no more than 0.1%. According to some embodiments, a high-concentration protein product may have an oxalic acid content of no more than 0.05% DMB.

Polyphenol Content

In some embodiments, a high-concentration protein product may be reduced in at least one polyphenol (e.g., tannin) In some embodiments, a high-concentration protein product (e.g., a solvent washed protein concentrate, a protein concentrate flake/granule, a protein concentrate flour), may comprise polyphenol (e.g., total soluble polyphenol) at a concentration (mg/100 g of high-concentration protein product) of less than about 1.5 mg/100 g, or less than about 1.55 mg/100 g, or less than about 1.6 mg/100 g, or less than about 1.65 mg/100 g, or less than about 1.7 mg/100 g, or less than about 1.75 mg/100 g, or less than about 1.8 mg/100 g, or less than about 1.85 mg/100 g, or less than about 1.9 mg/100 g, or less than about 2.0 mg/100 g, or less than about 2.2 mg/100 g, or less than about 2.4 mg/100 g, or less than about 2.6 mg/100 g, or less than about 2.8 mg/100 g, or less than about 3.0 mg/100 g, or less than about 3.2 mg/100 g.

Ash Content

According to some embodiments, a high-concentration protein product may include an ash content consisting of a residue containing inorganic mineral elements. An ash content in some embodiments may be determined by combusting a protein product at a high temperature (e.g., ≥500° C.) to remove organic matter. A high-concentration protein product may have an ash content lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by DMB of the protein product, in some embodiments. A high-concentration protein concentrate may be further processed to meet a desired ash content (e.g., higher or lower concentration, a desired ash composition), according to some embodiments.

Carbohydrate Content

According to some embodiments, a high-concentration protein product may have a carbohydrate content (e.g., pectin) lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by DMB of the protein product. A high-concentration protein product, in some embodiments, may have a carbohydrate content from about 1% to about 10%, or from about 10% to about 20%, or from about 20% to about 30%, or from about 30% to about 40%, or from about 40% to about 50% by DMB of the protein product. In some embodiments, a high-concentration protein product may have a carbohydrate content from about 1% to about 50%, or from about 2% to about 40%, or from about 5% to about 30%, or from about 8% to about 20%, or from about 10% to about 15% by DMB of the protein product. A high-concentration protein product may be further processed to meet a desired carbohydrate content (e.g., higher or lower concentration, a desired carbohydrate composition).

Dietary Fiber Content

In some embodiments, a high-concentration protein product may have a dietary fiber content of at least about 20% DMB, or at least about 25%, or at least about 30%, or at least about 35%, or at least about 40%, or at least about 45%, or at least about 50%, where "about" may represent plus or minus 3%. According to some embodiments, a high-concentration protein product may have a dietary fiber content between about 20% and about 45%, or between about 30% and about 45%, or between about 35% and about 45%, where "about" may represent plus or minus 3%. A high-concentration protein product may be further processed to meet a desired dietary fiber content (e.g., higher or lower concentration, a desired dietary fiber composition).

Water-Binding Capacity

In some embodiments, a high-concentration protein product may have a water-binding capacity of about 4 milliliters of water per gram of high-concentration protein product (ml/g), or about 4.5 ml/g, or about 5.0 ml/g, or about 6.0 ml/g, or about 7.0 ml/g, or about 7.5 ml/g, or about 8.0 ml/g, or about 8.5 ml/g, or about 9.0 ml/g, or about 9.5 ml/g, or about 10.0 ml/g. According to some embodiments, a high-concentration protein product may have a water binding capacity of at least 4 ml/g, or at least 5 ml/g, or at least 6 ml/g, or at least 7 ml/g, or at least 7.5 ml/g, or at least 8 ml/g, or at least 8.5 ml/g, or at least 9 ml/g, or at least 9.5 ml/g.

Oil-Binding Capacity

In some embodiments, a high-concentration protein product may have an oil-binding capacity (e.g., corn oil) of about 2 milliliters of oil (e.g., corn oil) per gram of high-concentration protein product (ml/g), or about 2.5 ml/g, or about 3.0 ml/g, or about 3.5 ml/g, or about 4.0 ml/g, or about 4.5 ml/g, or about 5.0 ml/g, or about 5.5 ml/g. According to some embodiments, a high-concentration protein product may have a water binding capacity of at least 2 ml/g, or at least 2.5 ml/g, or at least 3.0 ml/g, or at least 3.5 ml/g, or at least 4.0 ml/g, or at least 4.5 ml/g, or at least 5.0 ml/g, or at least 5.5 ml/g. For example, a high-concentration protein product produced by the processes described herein may include the contents summarized in Table 3 below.

TABLE 3

Example Compositions of High-Concentration Protein Products

| Characteristic | Product 1 | Product 2 | Product 3 | Product 4 |
| --- | --- | --- | --- | --- |
| Solids (DMB) | ≥90 | 88-95 | ≥90 | 88-95 |
| Moisture (DMB) | ≤10 | 5-12 | ≤10 | 5-12 |
| Protein (DMB) | ≥50 | 50-65 | ≥45 | 35-45 |
| PDCAASS | ≥0.90 | 0.88-0.94 | ≥0.90 | 0.88-0.94 |
| PDCASS Limiting Amino Acid | Histidine | Histidine | Histidine | Histidine |
| Digestibility | ≥0.90 | 0.85-0.96 | ≥0.90 | 0.85-0.96 |
| Fat (DMB) | ≤1 | 0.05-1.5 | ≤10 | 5-10 |
| Ash (DMB) | ≤10 | 5-15 | ≤10 | 5-15 |
| Dietary Fiber (DMB) | ≥40 | 35-45 | ≥40 | 35-45 |
| Other carbohydrates (DMB) | ≤5 | 1-10 | ≤5 | 5-10 |
| Oxalic acid | ≤1.5 | 0.2-2.5 | ≤1 | 0.2-2.0 |

Any desired method may be used to determine a composition of a high-concentration protein product.

A product and/or process, in some embodiments, may be configured or performed so other characteristics of a high-concentration protein product (e.g., particle size, bacterial specification) meet desired criteria and/or may be suitable for an intended purpose.

In some embodiments, a high-concentration protein product may be packed and/or sealed in either an industry standard bag or drum of varying sizes. A sealing method of industry-standard grade may be used to ensure proper shelf-life and shipping conditions. A bag or drum may include printed instructions or specifications regarding, for example, its intended use, shelf-life, suggested storage conditions, shipping conditions, compositions, or the like, or a combination thereof. An antioxidant (e.g., rosemary extract, Duralox®, Phyt-O-Blend CA) may be mixed with a protein product before drying or packaging, according to some embodiments. According to some embodiments, lecithin may be mixed with a wet protein product prior to drying to improve a mouth-feel of a product.

Various changes may be made in the shape, size, number, separation characteristic, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Various changes may be made in methods of preparing and using a composition, device, and/or system of the disclosure without departing from the scope of the instant disclosure. Where desired, some embodiments of the disclosure may be practiced to the exclusion of other embodiments.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In some embodiments, the degree of flexibility may simply be a specific percentage of the disclosed end point (e.g., ±1% where tight control of end point values is desirable, ±10% where end point values are flexible and/or vary according to other parameters). In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and/or a range endpoint. With respect to the former, a value of 50 depicted in an example, table, and/or drawing may form the basis of a range of, for example, about 45 to about 55, about 25 to about 100, and/or about 0 to about 100. Unless otherwise designated within this disclosure, percentages as applied to concentrations are percentages on a dry mass basis (DMB).

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1

Continuous Blanching of *Lemna* to Generate a High Concentration Protein Product Various blanching conditions were tested for their impact on multiple characteristics of a high-protein concentrate product. *Lemna* was cultivated in a growth medium including water and nutrients. The *Lemna* was harvested and conveyed to a continuous blanching apparatus including: a conveyor mechanism, a blanching tray connected to a vibratory mechanism capable of vibrating the blanching tray and generating a net motion in the blanching solution within blanching tray, a shower, a dewatering mechanism of a vibratory screen and screw press, a fluid bed dryer, and a pin mill.

The blanching apparatus was run at a product flow rate ratio of 7:1. Lots of 400-600 kg of *Lemna* were run through the continuous blanching system at a *Lemna* feed rate of 4 kg/minute. A pump rate was set at 28 L/min. Each lot was conveyed to the blanching tray where it was showered with a blanching solution having a temperature of between 92° C. and 94° C. as it exited the shower. Simultaneously, the vibratory mechanism generated waves in the blanching solution pooled in the blanching tray. The system was adjusted to maintain a contact time between blanching liquid and *Lemna* of 45 seconds. Following blanching for 45 seconds, each lot was dewatered using a vibratory screen and a screw press. The separated blanching solution was collected and diluted with fresh water in a dilution ratio of 2.4:1 (i.e., 9.6 L/m). A fluid bed dryer was used to dry each lot to a moisture content of about 10% to form a protein concentrate flake. The protein concentrate flake was milled using a pin mill to form a protein concentrate flour.

Compositional analysis was performed on the protein concentrate flour generated from the various lots. The average amino acid profile of the *Lemna* samples is found in Table 2. Average composition characteristics of the protein flour samples is found in Table 3. In the protein concentrate samples tested, the oxalic acid concentration of was <0.25% and the soluble polyphenol concentration was <3.2 mg/100 g. In most cases, the soluble polyphenol concentration was found to be below the detectable limits of the test. Table 4 depicts the average nutritional information of the *Lemna* protein concentrate flour samples.

TABLE 2

Amino Acid Profile of *Lemna* Protein Concentrate Flour
Amino Acid Profile (g/100 g protein concentrate flake)

| | |
|---|---|
| Tryptophan | 2.1 |
| Alanine | 4.8 |
| Arginine | 5.7 |
| Aspartic Acid | 7.8 |
| Glutamic Acid | 9.4 |
| Glycine | 4.1 |
| Histidine | 2.0 |
| Isoleucine | 4.4 |
| Leucine | 7.7 |
| Phenylalanine + Tyrosine | 8.8 |
| Proline | 3.9 |
| Serine | 3.4 |
| Threonine | 3.7 |
| Lysine | 6.0 |
| Valine | 5.3 |
| Cysteine + Methionine | 2.9 |

TABLE 3

Compositions of Protein Concentrate Flour

| Characteristic | |
|---|---|
| Solids (DMB) | ~92 |
| Moisture (DMB) | <8 |
| Protein (DMB) | 45-50 |
| PDCASS | 0.93 |
| Digestibility | ≥90 |
| Fat (DMB) | ≤7 |
| Ash (DMB) | <10 |
| Fiber (DMB) | 35-45 |
| Oxalic acid | ≤1 |

TABLE 4

Average nutritional information of *Lemna* protein concentrate flour

| TRAIT | UNIT | (per 100 g) | DMB % |
|---|---|---|---|
| Moisture | % | 2.77 | |
| Ash | % | 6.18 | 6.4% |
| Calories | Kcal | 449 | |
| Calories From Fat | | 69.30 | |
| Protein | % | 48.05 | 49.4% |
| Carbohydrates | % | 46.9 | 48.2% |
| Dietary Fiber | % | 39.85 | 41.0% |
| Sugars | % | 0 | 0.0% |
| Total Fat (AH) | % | 7.70 | 7.9% |
| Total Fat Acid Content | % | 6.99 | 7.2% |
| Saturated Fat | % | 1.51 | 1.6% |
| Monounsaturated | % | 0.15 | 0.2% |
| Polyunsaturated | % | 4.79 | 4.9% |
| Trans Fat | % | 0.23 | 0.2% |
| Cholesterol | mg/100 g | 0.84 | |
| Sodium | mg/100 g | 133 | |
| Vitamin A (B-Carotene) | IU/100 g | 56200 | |
| Vitamin C | mg/100 g | | |
| Calcium | mg/100 g | 1300 | |
| Iron | mg/100 g | 37 | |
| Vitamin E | IU/100 g | 12 | |
| Thiamine (B1) | mg/100 g | 0.03 | |
| Riboflavin (B2) | mg/100 g | 0.65 | |
| Niacin (B3) | mg/100 g | 0.537 | |
| Pantothenic acid (B5) | mg/100 g | 0.02 | |
| Vitamin B6 | mg/100 g | 0.275 | |
| Folic acid (B9) | mg/100 g | 229.91 | |
| Potassium | mg/100 g | 54.1 | |
| TRAIT | UNIT | (per 100 g) | % DMB |
| Magnesium | mg/100 g | 343 | |
| Zinc | mg/100 g | 10.3 | |
| Copper | mg/100 g | <1 | |
| Manganese | mg/100 g | 39.7 | |
| Phosphorus | mg/100 g | 640 | |
| Aluminum | ppm | 2.656 | |
| Boron | ppm | 643.797 | |
| Barium | ppm | 1.365 | |
| Cobalt | ppm | 0.01 | |
| Chromium | ppm | 0.296 | |
| Molybdenum | ppm | 0.53 | |
| Nickel | ppm | 0.1 | |
| Selenium | ppm | 0.01 | |
| Chlorophyll | mg/100 g | 540 | 0.56% |
| Lutein | mg/100 g | 38.5 | 0.0396% |
| Total polyphenols | mg GAE/kg | 3.244 | 0.0033% |

What is claimed is:

1. A method of continuously blanching a floating microcrop comprising at least one of *Lemna* and *Wolffia* to generate a high concentration protein product, the method comprising:
   generating a wave action in a volume of blanching solution to form a wave of blanching solution;
   contacting a first portion of the floating microcrop with the volume of blanching solution to generate a first blanched microcrop,
      wherein contacting the first portion of the microcrop comprises floating the first portion of the microcrop in the volume of blanching solution, wherein the wave of blanching solution repeatedly exposes a top surface of the first portion of the floating microcrop to the blanching solution;
   dewatering the first blanched microcrop to generate a volume of separated solution;
   collecting the volume of separated solution;
   generating a wave action in the volume of separated solution to form a wave of separated solution;
   contacting a second portion of the floating microcrop with the volume of separated solution to generate a second blanched microcrop,
   wherein contacting the second portion of the microcrop comprises floating the second portion of the microcrop in the volume of separated solution, wherein the wave of separated solution repeatedly exposes a top surface of the second portion of the floating microcrop to the separated solution;
   dewatering the second blanched microcrop;
   drying at least one of the first blanched microcrop and the second blanched microcrop to generate at least one of a protein concentrate flake and a protein concentrate granule.

2. The method of claim 1 further comprising diluting the separated solution.

3. The method of claim 1 further comprising milling at least one of the protein concentrate flake and the protein concentrate granule to generate a protein concentrate flour.

4. The method of claim 1 further comprising:
cultivating the microcrop in a first medium comprising at least one of an antiphotosynthetic dye and a calcium composition of at least 100 ppm; and
harvesting the microcrop.

5. The method of claim 4 further comprising: soaking the microcrop in a second medium, wherein the second medium comprises less than about 8 ppm of a calcium source, or less than about 4 ppm of a nitrogen source, or both.

6. The method of claim 1 wherein at least one of the protein concentrate flake and the protein concentrate granule comprises at least 45% protein, the protein having a PDCAAS value of at least 0.88.

7. The method of claim 1 wherein the contacting is for a period of less than 2 min.

8. The method of claim 1, wherein the contacting is for a period of about 45 seconds.

9. The method of claim 1, wherein the contacting is for a period of less than 2 min and wherein the volume of blanching solution has a temperature between about 75° C. and 95° C.

10. The method of claim 1 further comprising settling the first blanched microcrop, or the second blanched microcrop, or both in a settling solution.

11. The method of claim 1, wherein the dewatering is performed using a screw press.

12. The method of claim 1 further comprising solvent extracting the first blanched microcrop, or the second blanched microcrop, or both,
wherein a vibratory screen is used to dewater the first blanched microcrop, or the second blanched microcrop, or both prior to solvent extracting.

13. The method of claim 12, further comprising dewatering the first blanched microcrop, or the second blanched microcrop, or both after solvent extracting, wherein the dewatering is performed using a screw press.

14. The method of claim 1 further comprising washing the first portion of the microcrop, or the second portion of the microcrop, or both with at least one of a first wash solution, a second wash solution, and a third wash solution, wherein the first wash solution, the second wash solution, and the third wash solution are independently selected from a water, a recycled fluid, and an ozonated solution.

15. The method of claim 1, wherein generating the wave action in the volume of blanching solution to form the wave of blanching solution is performed using a vibratory mechanism.

16. The method of claim 1, wherein generating the wave action in the volume of separated solution to form the wave of separated solution is performed using a vibratory mechanism.

17. A high concentration protein product generated by the method of claim 1.

* * * * *